United States Patent
Kondos et al.

(10) Patent No.: US 10,676,594 B2
(45) Date of Patent: Jun. 9, 2020

(54) REACTIVE COMPOSITIONS CONTAINING MERCAPTO-FUNCTIONAL SILICON COMPOUND

(71) Applicant: Momentive Performance Materials Inc., Waterford, NY (US)

(72) Inventors: Constantine Kondos, White Plains, NY (US); Vikram Kumar, Tarrytown, NY (US); Martin Wusik, Danbury, CT (US)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 16/129,119

(22) Filed: Sep. 12, 2018

(65) Prior Publication Data
US 2019/0010309 A1 Jan. 10, 2019

Related U.S. Application Data

(63) Continuation of application No. 15/095,539, filed on Apr. 11, 2016, now Pat. No. 10,106,671.

(60) Provisional application No. 62/146,597, filed on Apr. 13, 2015.

(51) Int. Cl.
| | | |
|---|---|---|
| C08K 5/548 | (2006.01) |
| C09D 163/00 | (2006.01) |
| C08G 59/66 | (2006.01) |
| C08G 59/50 | (2006.01) |
| C08G 77/28 | (2006.01) |
| C08L 83/00 | (2006.01) |
| C08K 3/10 | (2018.01) |
| C08G 59/14 | (2006.01) |
| C08G 59/17 | (2006.01) |
| C09D 5/00 | (2006.01) |
| C08J 3/24 | (2006.01) |
| C09D 4/00 | (2006.01) |
| C09K 3/10 | (2006.01) |

(52) U.S. Cl.
CPC .......... *C08K 5/548* (2013.01); *C08G 59/1433* (2013.01); *C08G 59/1466* (2013.01); *C08G 59/1494* (2013.01); *C08G 59/5026* (2013.01); *C08G 59/66* (2013.01); *C08J 3/243* (2013.01); *C09D 5/002* (2013.01); *C09D 163/00* (2013.01); *C09K 3/1018* (2013.01); *C09D 4/00* (2013.01)

(58) Field of Classification Search
None
See application file for complete search history.

(56) References Cited

U.S. PATENT DOCUMENTS

| | | | |
|---|---|---|---|
| 5,868,819 A | 2/1999 | Guhde et al. | |
| 6,348,118 B1 * | 2/2002 | Johnson | C03C 27/048 156/273.3 |
| 7,053,149 B2 | 5/2006 | Anderson et al. | |
| 7,417,105 B2 | 8/2008 | Landon et al. | |
| 7,960,576 B2 | 6/2011 | Chaves et al. | |
| 8,158,812 B2 | 4/2012 | Chaves et al. | |
| 8,198,472 B1 | 6/2012 | Chaves et al. | |
| 2004/0253186 A1 | 12/2004 | Maillan et al. | |
| 2005/0143282 A1 | 6/2005 | Creutz et al. | |
| 2005/0244752 A1 * | 11/2005 | Yoshizawa | C08F 289/00 430/270.12 |
| 2008/0039562 A1 | 2/2008 | Chaves et al. | |
| 2008/0287611 A1 | 11/2008 | Ludewig et al. | |
| 2009/0297856 A1 | 12/2009 | Dohner et al. | |
| 2011/0027591 A1 | 2/2011 | Braun et al. | |
| 2011/0182846 A1 | 7/2011 | Ikeda et al. | |
| 2013/0059960 A1 * | 3/2013 | Koso | C09J 133/08 524/251 |

FOREIGN PATENT DOCUMENTS

| | | | | |
|---|---|---|---|---|
| JP | 10046125 A | * | 2/1998 | |
| WO | WO-2014098423 A1 | * | 6/2014 | C09J 133/08 |

OTHER PUBLICATIONS

LibreTexts, "Chain-growth Polymers—Addition Polymers," https://chem.libretexts.org/Bookshelves/Organic_Chemistry/Map%3A_Organic_Chemistry_(Smith)/Chapter_31%3A_Synthetic_Polymers/31.2%3A_Chain-Growth_Polymers%E2%80%94Addition_Polymers, last updated Jun. 5, 2019 (Year: 2019).*

* cited by examiner

Primary Examiner — Randy P Gulakowski
Assistant Examiner — Ha S Nguyen
(74) Attorney, Agent, or Firm — James C. Abruzzo

(57) ABSTRACT

There is provided herein a composition comprising (a) a mercapto-functional silicon compound having the general Formula (I):

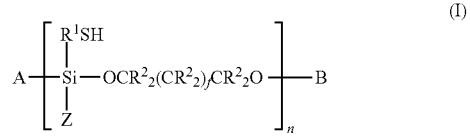

and a reactive resin containing at least one epoxy and/or (meth)acrylate group. There is also provided a silylated resin resulting from the reaction product of mercapto-functional silicon compound (a) and reactive resin contain at least one epoxy and/or (meth)acrylate groups.

17 Claims, No Drawings

REACTIVE COMPOSITIONS CONTAINING MERCAPTO-FUNCTIONAL SILICON COMPOUND

CROSS-REFERENCE TO RELATED APPLICATIONS

The present application is a continuation of U.S. patent application Ser. No. 15/095,539 filed on Apr. 11, 2016, to which priority is claimed from U.S. provisional Application No. 62/146,597 filed Apr. 13, 2015, both of which are incorporated herein by reference in their entireties.

FIELD OF THE INVENTION

The present invention is directed to reactive compositions containing mercapto-functional silicon compounds, more specifically, reactive compositions comprising a mixture of mercapto-functional silicon compounds and reactive epoxy and/or (meth)acrylate resins or reactive compositions comprising the reaction products of the mercapto-functional silicon compounds with epoxy resins and/or (meth)acrylate resin to form silylated resins and the use of each of these compositions in applications such as composites, coatings, adhesives and sealants.

BACKGROUND OF THE INVENTION

One- and two-component curable compositions are used extensively in composites, coatings, adhesives, sealants and other similar industrial applications. Specific types of one-component curable compositions are epoxy resins and (meth)acrylate resins which are cured upon exposure to radiation, e.g. ultraviolent light, gamma-radiation or electron beam radiation, and/or by the addition of a curing agent. Some specific types of two-component systems are epoxy resins and (meth)acrylate resins which are cured with amines or amino-functional silanes. Such systems generally require tin catalysts to facilitate an expedited cure. But, unfortunately, tin catalysts continue to face increasing environmental scrutiny.

As an alternative to amines or amino-functional silanes, there has been some limited use of mercapto-functional silanes for curing epoxy resins or as adhesion promoters for epoxy resins or (meth)acrylate resin compositions. The amino-functional silane or mercapto-functional silane react with the epoxy resins to form a chemical bond between the silanes and the epoxy resins, and in a subsequent step, cure through hydrolysis and condensation of the silyl group upon exposure to moisture. However, the mercapto-functional silane compounds have the undesirable side effect of a pungent odor which is created by the mercapto groups therein and the high volatility of the mercapto-functional silane.

Other alternatives have been to use epoxy-functional alkoxysilanes and amino-functional alkoxy silanes, but such compounds tend to produce volatile organic compounds (VOC's) or compounds which may be hazardous to humans or to the environment, such as methanol, during cure. These epoxy-functional alkoxysilane and amino-functional alkoxysilanes, which are used as adhesion promoters, may also suffer from less than optimal adhesion to certain metals, such as zinc surfaces due to either labile Si—O-Metal bonds or low levels of Metal-OH groups needed to form the Si—O-Metal bonds.

In the industry, there is a need for improved silane end-capper that may provide for crosslinking of epoxy resins and/or (meth)acrylate resin, either as the only curing mechanisms or as part of a dual cure mechanism, and/or an adhesion promoter to improve adhesion to metal surfaces, especially metal surfaces which do not readily form stable Si—O-Metal bonds between the silyl group and the metal, where these silane end-cappers and adhesion promoters reduce or eliminate the generation of volatile organic compounds during use.

SUMMARY OF THE INVENTION

The inventors herein have unexpectedly discovered a silane end-capper that may provide for crosslinking of epoxy resins and/or (meth)acrylate resin, either as the only curing mechanisms or as part of a dual cure mechanism, and/or an adhesion promoter to improve adhesion to metal surfaces, especially metal surfaces which do not readily form stable Si—O-Metal bonds between the silyl group and the metal, where these silane end-cappers and adhesion promoters reduce or eliminate the generation of volatile organic compounds during use.

In addition, the inventors herein have unexpectedly discovered mercapto-functional silicon compounds which avoid the pungent odor of most mercapto-functional akoxysilanes, and which provide for improved adhesion to metal substrates of epoxy and/or (meth)acrylate resins and/or provide for silylated resins which are the reaction products of the mercapto-functional silicon compounds and epoxy and/or (meth)acrylate resin, which silylated resins undergo moisture curing, with significantly decreased levels of VOC's during use as adhesion promoters and moisture curable crosslinkers.

In accordance with one embodiment of the present invention, there is provided herein a composition comprising:

(a) at least one mercapto-functional silicon compound having the general formula (I):

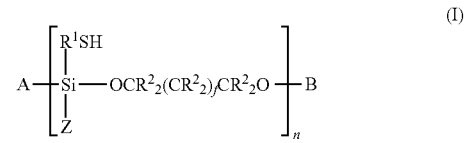

wherein A is —OR$^3$, —OCR$^2{}_2$(CR$^2{}_2$)$_f$CR$^2{}_2$OH, or

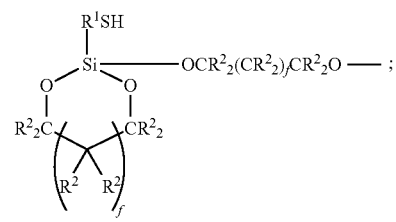

and

B is H, or

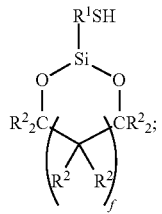

wherein each occurrence of Z is independently selected from the group consisting of

—OR$^3$,

—OCR$^2_2$(CR$^2_2$)$_f$CR$^2_2$OH,

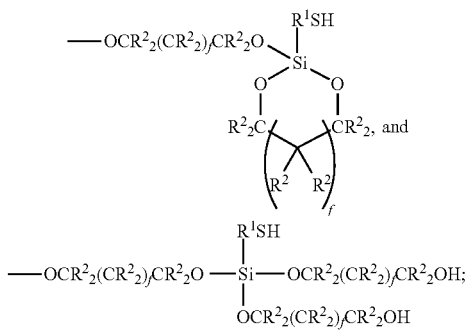

wherein each occurrence of R$^1$ is a divalent group independently selected from the group consisting of alkylene having 1 to 10 carbon atoms, cycloalkylene having from 5 to 12 carbon atoms, phenylene, and aralkyl having 6 to 10 carbon atoms;

wherein each occurrence of R$^2$ is a monovalent group independently selected from the group consisting of alkyl having 1 to 4 carbon atoms and hydrogen;

wherein each occurrence of R$^3$ is independently selected from the group consisting of hydrogen, alkyl having 1 to 12 carbon atoms, a cycloalkyl having 5 to 12 carbon atoms, phenyl and benzyl;

wherein each occurrence of the subscript f is independently an integer from 0 to 4; and wherein the subscript n is an integer from 0 to 15, with the proviso that when n is 0, then B is

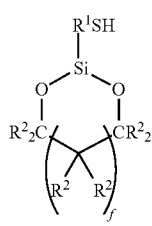

and/or partial hydrolyzates or condensate thereof having the general formula (II):

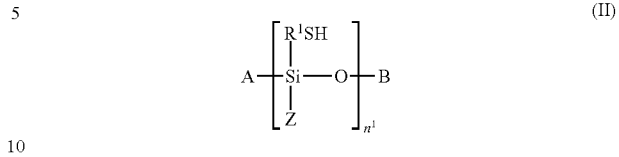

wherein A, B, Z and R$^1$ have the definition provided above and n$^1$ is an integer from 2 to 15; and (b) a reactive resin having at least one epoxy group and/or at least one (meth)acrylate group.

In another embodiment of the present invention, a silylated resin resulting from the reaction of the mercapto-functional silicon compound of general formula (I) and/or the partial hydrolyzates or condensate thereof of general formula (II) with an the epoxy resin, a (meth)acrylate resin or a resin containing both an epoxy group and a (meth) acrylate group is provided.

DETAILED DESCRIPTION OF THE INVENTION

It has been surprisingly found that the mercapto-functional silicon compound of the general formula (I) and its partial hydrolyzate(s) or condensate of formula (II) avoid the pungent odor of most mercapto-functional silanes, because the mercapto groups of the mercapto-functional silicon compound are bound into a structure which has a very low vapor pressure, which prevents the mercapto-functional silane monomers of the mercapto-functional silicon compound from volatilizing. Further, upon reaction of the mercapto-functional silicon compound with a reactive resin containing an epoxy ring, a (meth)acrylate group or both an epoxy ring and a (meth)acrylate group, the resulting reaction product of the reaction of the thiol (mercapto) group from the mercapto-functional silicon compounds with the epoxy ring and/or (meth)acrylate group forms a thiol ether group (C—S—C), which has less odor, and the resulting reaction product has low vapor pressure, and thus, does not volatilize, resulting in a less foul smelling composition and low levels of VOC's.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification. It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In accordance with one embodiment of the present invention, there is provided herein a composition comprising:

(a) at least one mercapto-functional silicon compound having the general formula (I):

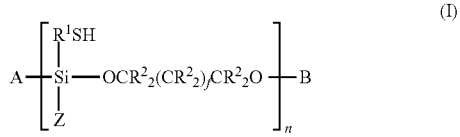

wherein A is —OR³, —OCR²₂(CR²₂)$_f$CR²₂OH, or

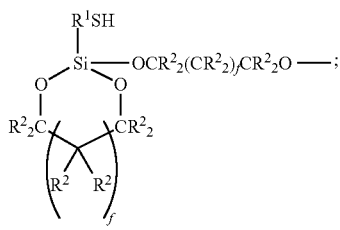

and

B is H, or

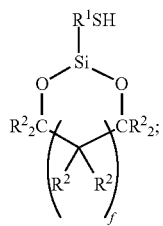

wherein each occurrence of Z is independently selected from the group consisting of

—OR³,

—OCR²₂(CR²₂)$_f$CR²₂OH,

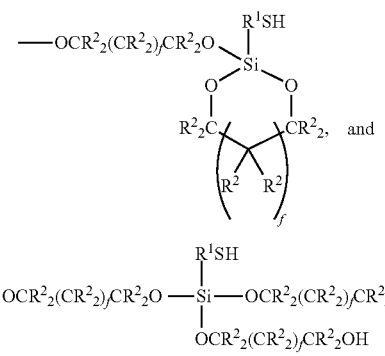

wherein each occurrence of R¹ is a divalent group independently selected from the group consisting of alkylene having 1 to 10 carbon atoms, cycloalkylene having from 5 to 12 carbon atoms, phenylene, and aralkyl having 6 to 10 carbon atoms;

wherein each occurrence of R² is a monovalent group independently selected from the group consisting of alkyl having 1 to 4 carbon atoms and hydrogen;

wherein each occurrence of R³ is independently selected from the group consisting of hydrogen, alkyl having 1 to 12 carbon atoms, a cycloalkyl having 5 to 12 carbon atoms, phenyl and benzyl;

wherein each occurrence of the subscript f is independently an integer from 0 to 4; and wherein the subscript n is an integer from 0 to 15, with the proviso that when n is 0, then B is

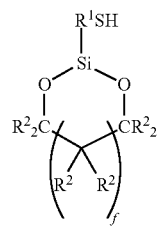

and/or partial hydrolyzates or condensate thereof having the general formula (II):

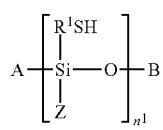

wherein A, B and $R^1$ have the definition provided above and $n^1$ is an integer from 2 to 15; and (b) a reactive resin having at least one epoxy group and/or at least one (meth)acrylate group.

In one more specific embodiment herein the reactive composition comprising the mercapto-functional silicon compound (a) of the general formula (I) or its partial hydrolyzate(s) and/or condensate(s) of the general formula (II) is such that $R^1$ is selected from the group consisting of —$CH_2$—, —$CH_2CH_2$—, —$CH_2CH_2CH_2$—, —$CH_2CH(CH_3)CH_2$—, or —$CH_2CH(CH_3)CH_2CH_2$—, $R^2$ is selected from the group consisting of hydrogen, —$CH_3$ or —$CH_2CH_3$, f is 0 or 1; n is 0, 1, 2 or 3; and $n^1$ is 1, 2 or 3.

In one even more specific embodiment the reactive composition comprising the mercapto-functional silicon compound (a) of the general formula (I) is such that $R^1$ is —$CH_2CH_2CH_2$—, $R^2$ is hydrogen or —$CH_3$, f is one, and n is 0 or 1, preferably 0, and $n^1$ is 1.

In yet still another more specific embodiment the reactive composition comprising the mercapto-functional silicon compound (a) of the general formula (I) or its partial hydrolyzates and/or condensates of the general formula (II) is such that $R^1$ is selected from the group consisting of —$CH_2$—, —$CH_2CH_2$—, —$CH_2CH_2CH_2$—, —$CH_2CH(CH_3)CH_2$—, or —$CH_2CH(CH_3)CH_2CH_2$—, $R^2$ is selected from the group consisting of hydrogen, —$CH_3$ or —$CH_2CH_3$, A is —$OCR^2_2(CR^2_2)_fCR^2_2OH$; Z is —$OCR^2_2(CR^2_2)_fCR^2_2OH$; f is 0 or 1; n is 0, 1, 2 or 3; and $n^1$ is 1, 2 or 3.

In one specific embodiment the reactive composition comprising the mercapto-functional silicon compound (a) of the general formula (I) is of the formula (III):

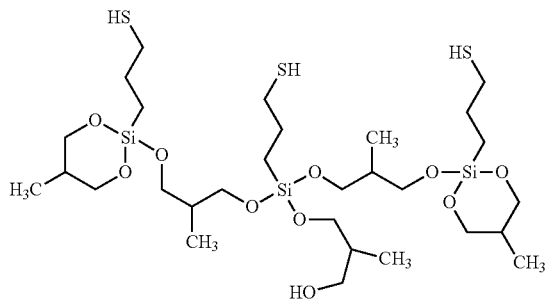

In one embodiment herein there is provided the partial hydrolyzate or condensate of the mercapto-functional silicon compound of the general formula (I) described herein, which partial hydrolyzate or condensate is of the general formula (II). Moreover, it is understood that the partial hydrolyzate or condensate of the mercapto-functional silicon compound of the general formula (I) may be encompassed as a side product of most methods of manufacture of the mercapto-functional silicon compound of the general formula (I). Also, the partial hydrolyzate or condensate can occur upon storage of mercapto-functional silicon compound of the general formula (I), especially in humid conditions, or under conditions in which residual water remaining from their preparation is not completely removed subsequent to their preparation. Furthermore, partial to substantial hydrolysis of the mercapto-functional silicon compound of the general formula (I) may be deliberately prepared by incorporating the appropriate stoichiometry or excess of water into the methods of preparation described herein for the mercapto-functional silicon compound of the general formula (I). Also, the siloxane content of the mercapto-functional silicon compound of the general formula (I) may be deliberately prepared by incorporating the appropriate stoichiometry or excess of water into the methods of preparation for the silanes described herein.

In another embodiment, a partial hydrolyzate is defined as mercapto-functional silicon compound of formula (I) in which at least one A or Z group is bonded to at least one silicon atom and is defined as —OH, the molar ratio of the number of —OH groups per silicon atom being from 0.1 to 1.

In another embodiment herein there is provided a reactive composition comprising (a) the mercapto-functional silicon compound of the general formula (I) described herein, (b) a reactive resin having at least one epoxy group and/or at least one (meth)acrylate group, and (c) a curing agent, e.g., radiation, a catalyst, a crosslinker or chain extender.

In another embodiment herein, the reactive resin (b) is an epoxy resin (component) where the epoxy resin is an organic compound or mixtures of organic compounds having at least one 1,2-epoxy groups per molecule with an epoxide equivalent weight in the range of from about 100 to about 12,000 grams per equivalent, more specifically from about 150 to about 2,000 grams per equivalent and even more specially about 185 to about 500 grams per equivalent. More specifically, the epoxy resin is an organic compound or mixtures of organic compounds having from 2 to 8 reactive 1,2-epoxy groups per molecule.

In one embodiment, the epoxy equivalent weight is determined in accordance with ASTM D1652-11e1, Standard Test Method for the Epoxy Content of Epoxy Resins. In another embodiment, the epoxy equivalent weight is determined in accordance with the method described in, "Determination of the epoxide equivalent weight of glycidyl ethers by proton magnetic nuclear resonance spectrometry, J. G. Dorsey, G. F. Dorsey, A. C. Rutenberg, L. A. Green, Anal. Chem., 1977, 49 (8), pp 1144-1145". The preferred method is ASTM D1652-1 1e1.

In one more embodiment, the reactive resin (b) is an epoxy resin that has the general formula (IV):
wherein:

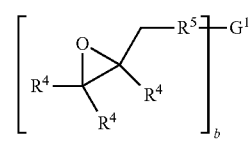

each occurrence of $R^4$ is independently hydrogen, or an alkyl group of from 1 to 8 carbon atoms, more specifically from 1 to 6 carbon atoms, a phenyl group or an aralkyl or arenyl group of from 7 to 12 carbon atoms, more specifically from 7 to 10 carbon atoms;

each occurrence of $R^5$ is a divalent organic group of from 1 to 12 carbon atoms or a chemical bond;

$G^1$ is a divalent or polyvalent organic group containing from 1 to 2,000 carbon atoms; and b is an integer of from 2 to 8.

In another embodiment, the epoxy resin having Formula (IV) is such that, $R^1$ is hydrogen or methyl; $R^5$ is a chemical bond, or a —C(=O)—, —C(=O)O—, —$C_cH_{2c}$—, —$C_cH_{2c}O$—, —$C_cH_{2c}OC(=O)$—, —$C_cH_{2c}C(=O)$—, —$C_cH_{2c}C(=O)O$— or —$(C_cH_{2c}O)_d$ group, wherein each occurrence of c and d is independently an integer where c is from 1 to 8 and d is from is 1 to 6, which the proviso that when the linking atom of the $R^5$ to the $G^1$ group is oxygen, then the oxygen atoms is bonded to a carbon atom of $G^1$; and $G^1$ is a divalent or polyvalent hydrocarbon group containing from 1 to 2,000 carbon atoms, more specifically 1 to 700 carbon atoms, derived from an linear or branched alkyl, cycloalkyl, alkenyl, aralkyl, aryl, arenyl or a group derived from a heterocarbon containing from 1 to 2,000 carbon atoms, more specifically, 1 to 700 carbon atoms at least one functional group selected from the group consisting of —O—, N=, —OH, —S—, —C(=O)—, —C(=O)O—, —C(=O)OH and —C(=O)S—, and b is 2 to 5.

Representative and non-limiting examples of $R^4$ include hydrogen, methyl, ethyl, propyl, isobutyl, phenethyl, phenyl, tolyl, xylyl. Preferably, $R^4$ is hydrogen or methyl and more preferably, hydrogen.

Representative and non-limiting examples of $R^5$ include a chemical bond, methylene, ethylene, propylene group, —$CH_2O$— and —$CH_2C(=O)O$—.

Representative and non-limiting examples of $G^1$ include hydrogenated cyclohexane dimethyl, where z is an integer of from to 12;

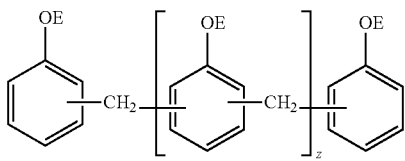

where E is hydrogen or a bond to the

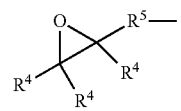

group of formula (IV); and z is an integer of from 0 to 12;

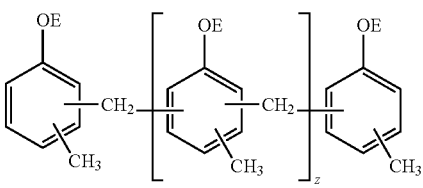

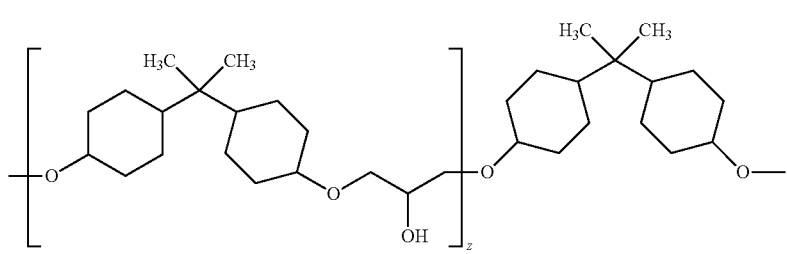

where z is an integer of from 0 to 12;

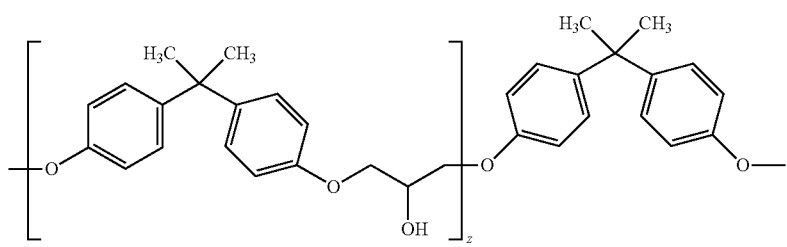

where E is hydrogen or a bond to the

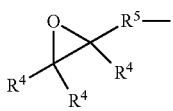

groups of formula (IV); and z is an integer of from 0 to 12;

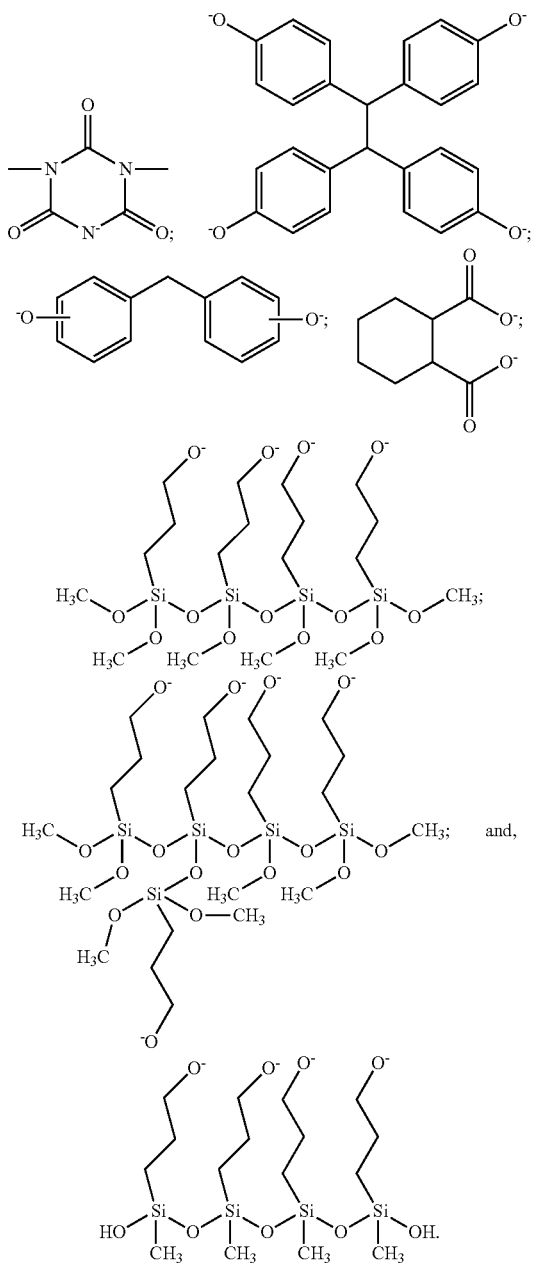

Representative and non-limiting examples of the epoxy resin component include 2-{4-[1-methyl-1-(4-oxiranyl-methoxy-cyclohexyl)-ethyl]-cyclohexyloxymethyl}-oxirane, diglycidyl ether of bisphenol A, hydrogenated diglycidyl ether of bisphenol A, epoxy phenol novolac resins, epoxy silylated novolac resins, diglycidyl ether of bisphenol F, tetraglycidyl ether of tetrakis(4-hydroxyphenyl)ethane, triglycidyl-p-aminophenol, N,N,N',N'-tetraglycidyl-4,4'-diaminodiphenylmethane, N,N,N',N'-tetraglycidyl-m-xylenediamine, triglycidyl isocyanurate, [methyl-(3-oxiranyl-methoxy-propyl)-hydroxy-siloxy]-methyl-(3-oxiranylmethoxy-propyl)-silanol and diglycidyl ether of hexahydrophthalic acid.

Other suitable epoxy resin components are acrylic polymers containing epoxy groups. These acrylic polymers are formed by copolymerizing an unsaturated epoxy-containing monomer, such as for example, glycidyl acrylate or glycidyl methacrylate monomers, with monomeric compounds containing at least one $CH_2=CH-$, monolefinic and diolefinic hydrocarbons, such as styrene, alpha-methyl styrene, 1,3-butadiene, isoprene and the like, halogenated monoolefinic and diolefinic hydrocarbons, such as alpha-chlorostyrene, vinyl chloride, chlorobutadiene, and the like, and ester of organic acids, such as vinyl acetate, vinyl propionate, vinyl butyrate, methyl acrylate, ethyl acrylate, propyl acrylate, isopropyl acrylate, butyl acrylate isobutyl acrylate, amyl acrylate, hexyl acrylate, hexyl acrylate, 2-ethylhexyl acrylate, heptyl acrylate, octyl acrylate, 3,5,5-trimethylhexyl acrylate, decyl acrylate, dodecyl acrylate, methyl methacrylate, ethyl methacrylate, propyl methacrylate, isopropyl methacrylate, butyl methacrylate isobutyl methacrylate, amyl methacrylate, hexyl methacrylate, hexyl methacrylate, 2-ethylhexyl methacrylate, heptyl methacrylate, octyl methacrylate, 3,5,5-trimethylhexyl methacrylate, decyl methacrylate and methdodecyl acrylate and the like.

Preferably the epoxide resins contain glycidyl ether or ester groups, are liquid and have weight per epoxide in the range of from about 100 to 500 grams per epoxide.

Preferred epoxide resins for reactive resin (b) are those such as EPON Liquid Epoxy Resins 825, 826, 828, 830, 834, 862, 863, 813, 815C, 824, 872, 896, 8131, 8132, 8201, 8280, 8281, CS-241, CS-242 and CS-377; Epoxy Resin solution Epikote Resin 874L; EPON Epoxy Resin Solutions 834-F-90, 834-X-90, 872-X-75, 874-CX, 1001-B-80, 1001-CX, 1001-H-75, 1001-K-65, 1001-O-75, 1001-T-75, 1001-X-75, 1001-UY, 8521-MX, CS-267 and CS-373; EPON Solid and Powder Grade Epoxy Resin Solutions 1001F, 1002F, 1004F, 1007F, 1009F, 2002, 2004, 2005, 2014, 2024 and 3002; Epoxy Novolac Resin Epikote Resin 170; EPON Epoxy Novolac Resins 154, 160, 161, 162, 164, 165, 170, 1031, 1031-A-70, SU-2.5 and SU-8; EPON Epoxy Polyacrylates 8021, 8111 and 8161; EPON Elastomer Modified Epoxy Resins 58005, 58006, 58034 and 58901; Ultra High Molecular Weight Resin EPONOL Resin 53-BH-35; Cycloaliphatic Epoxy Resin EPONEX Resin 1510; EPI-REZ RESIN Cycloaliphatic Epoxy Waterborne Epoxy Resins and Curing Agents 3510-W-60, 3515-W-60, 3520-WY-55, 3521-WY-53, 3522-W-60, 3540-WY-55, 3546-WH-53, 5003-W-55, 5520-W-60, 5522-WY-55, 6006-W-68, 6520-WH-53, WD-510 and WD-512; Epoxy Research Resin RSW-4364; EPON Resin RSW-2801; non-aromatic hydrogenated cyclohexane dimethanol and diglycidyl ethers of hydrogenated Bisphenol A-type epoxy resin, such as Epon DPL-862, Eponex 1510, Heloxy 107 and Eponex 1513 (hydrogenated bisphenol A-epichlorohydrin epoxy resin) all from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulenc located in Louisville, Ky.; Aroflint 393 and 607 from Reichold located in Pensacola, Fla.; and ERL4221 from Dow Chemical. Other suitable non-aromatic epoxy resins include DER 732 and DER 736. In one embodiment, the non-aromatic epoxy resin suitable for use in the composition of the invention is a cycloaliphatic epoxide resin selected from the group consisting of hydrogenated Bisphenol A diglycidylether, cyclohexane dimethanol diglycidyl ether, methyl-(3-oxiranylmethoxy-propyl)-functional polysiloxanes, such as Silquest* MP200, and combinations thereof.

In another embodiment herein, the reactive resin (b) is a (meth)acrylate resin, where the methacrylate resin is an organic compound or mixtures of organic compounds having at least one (meth)acrylate groups per molecule with a number average molecular weight in the range of from 100 to 12,000, more specifically from 150 to 2,000 and even more specially 185 to 500. More specifically, the (meth)acrylate resin is an organic compound or mixtures of organic compounds having from 2 to 8 reactive (meth)acrylate groups per molecule.

In one embodiment, the number average molecular weight is determined in accordance with ASTM D5396-11, Standard Test Method for Molecular Weight Averages and Molecular Weight Distribution of Polystyrene by High Performance Size-Exclusion Chromatography using a series of polystyrene standards.

In one more embodiment, the reactive resin (b) is a (meth)acrylate resin that has the general Formula (V):

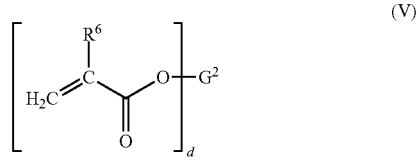

wherein each occurrence of $R^6$ is independently hydrogen or methyl, preferably hydrogen;

wherein $G^2$ is a divalent or a polyvalent organic group containing from 1 to 2,000 carbon atoms, with the proviso that the oxygen of the $H_2C=C(R^6)C(=O)O-$ group is bonded to the carbon atom of the $G^2$ group; and wherein d is an integer of from 2 to 8.

In one embodiment, the (meth)acrylate resins in a (meth)acrylate of a bisphenol diglycidyl ether polymer or a (meth)acrylate of a hydrogenated bisphenol diglycidyl ether polymer having the general formula (VI):

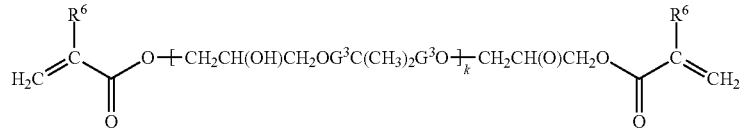

wherein $R^3$ is hydrogen or methyl, preferably hydrogen, $G^3$ is independently a paraphenylene or a divalent cyclohexyl group, and k is a integer of from 1 to 10. The (meth)acrylate of a bisphenol diglycidyl ether polymer includes acrylates of bisphenol-A, —F, and —S diglycidyl ether polymer and in particular wherein k is less than 5. Preferably, the number average molecular weight is between 400 and 3,000.

Representative and non-limiting acrylates of a bisphenol A diglycidyl ether polymer are commercially available under the trademarks of SP-1507, SP-1 509, SP-1519-1, SP-1563, SP-2500, VR-60, VR-77, VR-90 (manufactured by Showa High polymer Co., Ltd.), Viscoat 540 (manufactured by Osaka Organic Chemical Industry Co., Ltd.), and Epoxy Ester 3000A, 3000 M (manufactured by Kyoeisha Chemical Co., Ltd.).

The reactive resin (b) includes mono-(meth)acrylates compounds, multi-(meth)acrylate compounds having greater than two (meth)acrylate groups and mixtures of mono-(meth)acrylates compounds and/or multi-(meth)acrylate compounds having greater than two (meth)acrylate groups.

Representative and non-limiting examples of the mono-functional monomer include (meth)acryloyl group containing-monomers such as acrylamide, 7-amino-3,7-dimethyloctyl acrylate, isobutoxymethyl acrylamide, isobornyloxyethyl acrylate, isobornyl acrylate, 2-ethylhexyl acrylate, ethyldiethylene glycol acrylate, t-octyl acrylamide, diacetone acrylamide, N,N-dimethylaminoethyl acrylate, N,N-diethylaminoethyl acrylate, lauryl acrylate, dicyclopentadiene acrylate, dicyclopentenyloxyethyl acrylate, dicyclopentenyl acrylate, N,N-dimethyl acrylamide tetrachlorophenyl acrylate, 2-tetrachlorophenoxyethyl acrylate, tetrahydrofurfuryl acrylate, tetrabromophenyl acrylate, 2-tetrabromophenoxyethyl acrylate, 2-trichlorophenoxyethyl acrylate, tribromophenyl acrylate, 2-tribromophenoxyethyl acrylate, 2-hydroxyethyl acrylate, 2-hydroxypropyl acrylate, phenoxyethyl acrylate, butoxyethyl acrylate, pentachlorophenyl acrylate, pentabromophenyl acrylate, polyethylene glycol mono acrylate, polypropylene glycol mono acrylate, bornyl acrylate, methyltriethylene diglycol acrylate, 7-amino-3,7-dimethyloctyl methacrylate, isobutoxymethyl methacrylamide, isobornyloxyethyl methacrylate, isobornyl methacrylate, 2-ethylhexyl methacrylate, ethyldiethylene glycol methacrylate, t-octyl methacrylamide, diacetone methacrylamide, N,N-dimethylaminoethyl methacrylate, N,N-diethylaminoethyl methacrylate, lauryl methacrylate, dicyclopentadiene methacrylate, dicyclopentenyloxyethyl methacrylate, dicyclopentenyl methacrylate, N,N-dimethyl methacrylamide tetrachlorophenyl methacrylate, 2-tetrachlorophenoxyethyl methacrylate, tetrahydrofurfuryl methacrylate, tetrabromophenyl methacrylate, 2-tetrabromophenoxyethyl methacrylate, 2-trichlorophenoxyethyl methacrylate, tribromophenyl methacrylate, 2-tribromophenoxyethyl methacrylate, 2-hydroxyethyl methacrylate, 2-hydroxypropyl methacrylate, phenoxyethyl methacrylate, butoxyethyl methacrylate, pentachlorophenyl methacrylate, pentabromophenyl methacrylate, polyethylene glycol mono methacrylate, polypropylene glycol mono methacrylate, bornyl meth acrylate, methyltriethylene diglycol methacrylate and the compounds represented by the general formula (VII)-(IX):

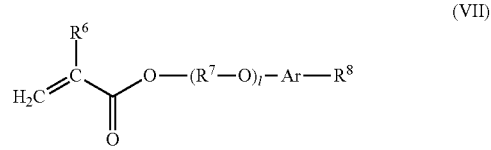

wherein $R^6$ is hydrogen or methyl, $R^7$ is an alkylene group of from 2 to 6 carbon atoms, $R^8$ is hydrogen or an alkyl group having 1 to 12 carbon atoms, Ar is a divalent aromatic group having 6 to 10 carbon atoms, and 1 is an integer of from 0 to 12;

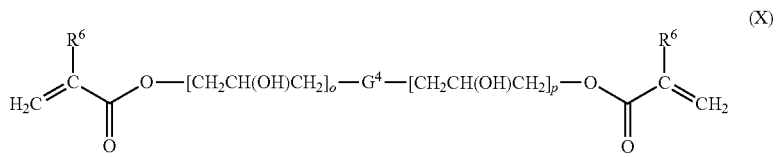

wherein $R^6$ is hydrogen or methyl, $R^7$ is an alkylene group of from 2 to 6 carbon atoms and m is an integer of from 1 to 8; and

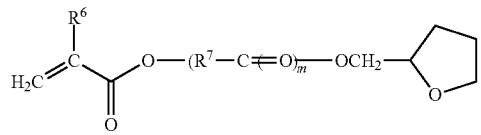

wherein $R^6$ is hydrogen or methyl, $R^7$ is an alkylene group of from 2 to 6 carbon atoms; $R^9$ is independently hydrogen or methyl and m is an integer of from 1 to 8;

Representative and non-limiting examples of commercially available dipentaerythritol monohydroxypentaacrylate include under the trademarks of SR399, SR399E, SR9041, (manufactured by Sartomer Co.).

Representative and non-limiting examples of the polyfunctional (meth)acrylate resins include ethylene glycol diacrylate, dicyclopentenyl diacrylate, triethylene glycol diacrylate, tetraethylene glycol diacrylate, tricyclodecanediyldimethylene diacrylate, trimethylolpropane diacrylate, trimethylolpropane triacrylate, trimethylolpropane trioxyethylacrylate, ditrimethylolpropane tetraacrylate, tripropylene glycol diacrylate, neopentyl glycol diacrylate, both terminal diacrylic acid adduct of bisphenol A diglycidyl ether, 1,4-butanediol diacrylate, 1,6-hexanediol diacrylate, pentaerythritol triacrylate, pentaerythritol tetraacrylate, dipentaerythritol hexaacrylate, polyester diacrylate, polyethylene glycol diacrylate, ethylene glycol dimethacrylate, dicyclopentenyl dimethacrylate, triethylene glycol dimethacrylate, tetraethylene glycol dimethacrylate, tricyclodecanediyldimethylene dimethacrylate, trimethylolpropane dimethacrylate, trimethylolpropane trimethacrylate, trimethylolpropane trioxyethylmethacrylate, ditrimethylolpropane tetra methacrylate, tripropylene glycol dimethacrylate, neopentyl glycol dimethacrylate, both terminal dimethacrylic acid adduct of bisphenol A diglycidyl ether, 1,4-butanediol dimethacrylate, 1,6-hexanediol dimethacrylate, pentaerythritol trimethacrylate, pentaerythritol tetramethacrylate, dipentaerythritol hexamethacrylate, polyester dimethacrylate, polyethylene glycol dimethacrylate and (meth)acrylate group-containing resins having the general formula (X):

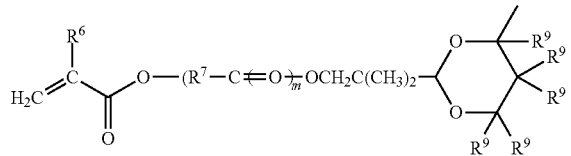

wherein $R^6$ represents a hydrogen atom or a methyl group, $G^4$ represents a divalent group such as an alkylene group having from 2 to 6 carbon atoms, preferably 2 to 4 carbon atoms, a phenylene group, a biphenylene group, a naphthylene group, p is independently an integer from 1 to 10, preferably from 1 to 5 and q is independently an integer from 1 to 10, preferably from 1 to 5.

Representative and non-limiting examples of the (meth) acrylate resins of formula (X) include tricyclodecanediyldimethylene diacrylate, tetraethylene glycol diacrylate, tripropylene glycol diacrylate, neopentyl glycol diacrylate, polyethylene glycol diacrylate, tricyclodecanediyldimethylene dimethacrylate, tetraethylene glycol dimethacrylate, tripropylene glycol dimethacrylate, neopentyl glycol dimethacrylate and polyethylene glycol dimethacrylate.

In one specific embodiment, the (meth)acrylate resins listed are those containing only the acrylate groups.

These polyfunctional monomers are commercially available under the trademarks, for example, of Yupimer UV, SA1002 (manufactured by Mitsubishi Chemical Corp.), Viscoat 700 (manufactured by Osaka Organic Chemical Industry, Ltd.), KAYARAD R-604, DPCA-60, DPCA-30, DPCA-120, HX-620, D-310, D-330 (manufactured by Nippon Kayaku Co., Ltd.), Aronix M-210, M-315, (manufactured by Toagosei Co., Ltd.), Epoxy Ester 40EM, 70PA, 200PA, 1600A, 80MFA, 3002M, 3002A, 3000M, 3000A, 200EA, 400EA (manufactured by Kyoeisha Chemical Co., Ltd.).

The above monofunctional monomers and polyfunctional monomers may be used either singly or in combinations of two more.

In certain embodiments, reactive resin component (b) is present in the composition in an amount ranging from 5 to 99.9 percent by weight, more specifically from 10 to 80 percent by weight, even more particularly from 20 to 50 percent by weight, or, in some cases, even more particularly from 30 to 40 percent by weight, with the weight percents being based on the total weight of components (a) and (b) of the reactive resin composition.

In other embodiments, the mercapto-functional silicon compound (a) is present in the composition in an amount ranging from 0.1 to 95 percent by weight, more specifically from 20 to 90 percent by weight, even more particularly from 50 to 70 weight, or, in some cases, even more particularly from 60 to 70 percent by weight, with the weight percents being based on the total weight of components (a) and (b) of the resin composition.

In one specific embodiment, the weight ratio of mercapto-functional silicon compound (a) to the reactive resin (b), which is a (met)acrylate-containing resin, is from 10 to 30 weight percent, preferably 20 to 25 weight percent mercapto-functional silicon compound (a) and from 70 to 90 weight percent, preferably from 75 to 80 weight present reactive resin (b) containing at least one (meth)acrylate group, based on the weights of components (a) and (b).

In yet another embodiment herein, the reactive resin composition further comprises a the curing agent (c), where the curing agent is selected from the group consisting of radiation, e.g. ultraviolet radiation, gamma-radiation or electron beam radiation, a catalyst, a hardener, e.g., a chain extender or crosslinker, and combinations thereof.

More specifically, when the reactive resin (b) is an epoxy resin, the catalyst can be a tertiary amine catalyst such as the non-limiting examples of dimethyl propyl amine, dimethyl phenylamine, triethylamine and combinations thereof.

In another embodiment the curing agent (c) for the reactive compositions containing epoxy resins is a hardener. Hardeners as curing agent component (c) are organic compounds that contain functional groups that are reactive resin (b) which contains at least one epoxy functional group. These hardeners react with the epoxy resin to crosslink the resin. Hardeners include, for example, those selected from the group consisting of aliphatic primary amines, aromatic primary amines, aliphatic secondary amines, aromatic secondary amines, aliphatic primary polyamines, aromatic primary polyamines, aliphatic secondary polyamines, aromatic secondary polyamines, polyamides, amidoamines, ketimines, aldimines, mercaptans, isocyanates, melamine formaldehyde resins, urea formaldehyde resins, phenol formaldehyde resins, carboxylic acids, carboxylic acid anhydrides, or combinations thereof.

Representative and non-limiting examples of hardeners as component (c) include dicyandiamide, ethylene diamine, diethylene triamine, triethylene tetraamine, tetraethylene pentamine, benzene-1,4-diamine, m-phenylenediamine, poly(oxypropylene diamine), poly(oxypropylene triamine), poly(glycol amine), 1,2-diaminocyclohexane, 4,4'-diaminodiphenyl sulfone, 4,4'-diaminodiphenyl methane, dihydroxylethyl diethylene triamine, N-aminoethylpiperazine, isophorone diamine, 1,2-diaminocyclohexane, the reaction product of tall-oil fatty acid with diethylene triamine, phthalic anhydride, tetrahydrophthalic anhydride, methyltetrahydrophthalic anhydride, hexahydrophthalic anhydride, nadic methyl anhydride, chloroendic anhydride, isophorone diisocyanate, and the like.

Some commercial examples of hardeners which can function as the curing agent (c) herein are EPIKURE Waterborne Curing Agents 6870-W-53, 8290-Y-60, 8535-W-50, 8536-MY-60, 8537-MY-60, 8540-MU-60 and 8538-Y-68; EPIKURE Amidoamine Curing Agents 3010, 3015, 3030, 3046, 3055, 3061, 3072 and 3090; EPIKURE Polyamide Curing Agents 3100-ET, 3115, 3115-E-73, 3115-X-70, 3125, 3140, 3155, 3164, 3175, 3180-F-75, 3192, 3115A, 3115-X-70A, 3125A and 3140A; EPIKURE Aliphatic Amine Curing Agents 3200, 3223, 3234, 3245, 3202, 3230, 3233 and 3253; EPIKURE Modified Aliphatic Amines Curing Agents 3213, 3251, 3270, 3271, 3273, 3274, 3277, 3282, 3290, 3292-FX-60 and 3295; EPIKURE Cycloaliphatic Amines Curing Agents 3300, 3370, 3378, 3380, 3381, 3382, 3383, 3387, 3388 and 3389; EPIKURE Ketimine Curing Agent 3502; and, EPIKURE Powder Coating Curing Agents P-1101, P-101, P-103, P-104, P-108, P-201 and P-202.

In certain embodiments, the curing agent (c) is used at 0.1 to 1.9 equivalent(s) of N—H on the polyamine hardener (curing agent) per equivalent of epoxy, $C_2O$, on the epoxy resin, preferably from 0.5 to 1.25 equivalent(s) of N—H on polyamine hardener per equivalent of epoxy, $C_2O$, on the epoxy resin and more preferably from 0.95 to 1.05 equivalent(s) of N—H on the polyamine hardener per equivalent of epoxy, $C_2O$, on the epoxy resin.

In another embodiment, hardener is present in the epoxy-based composition in an amount ranging from 1 to 95 percent by weight, more particularly from 2 to 40 percent by weight, or, in some cases, even more particularly from 5 to 18 percent by weight, with the weight percents being based on the total weight of components.

When the reactive compositions contains as the reactive resin (b) a (meth)acrylate resin, the curing agent (c) is radiation in combination with a radiation active initiator. As the radiation active initiator, any compounds which decompose by exposure to radiation and produce radicals to start polymerization may be used.

Further, a photosensitizer may be used as required.

As used herein, "radiation" includes UV rays, visible rays, X-rays, electron beams, α-rays, β-rays, γ-rays, and the like.

Representative and non-limiting examples of compounds used as such a radiation active initiator are 1-hydroxycyclohexylphenyl ketone, 2,2-dimethoxy-2-phenylacetophenone, 2-hydroxy-2-methyl-1-phenylpropan-1-one, 1-(4-isopropylphenyl)-2-hydroxy-2-methylpropan-1-one, 1, 1-dimethoxydeoxybenzoin, 3,3'-dimethyl-4-methoxybenzophenone, 1-(4-dodecylphenyl) 2-hydroxy-2-methylpropan-1-one, 2-methyl-1-[4-(methylthio)phenyl]-2-morpholinopropan-1-one, 2,4,6-trimethylbenzoyl diphenylphosphine oxide, ethyl-2,4,6-trimethylbenzoylphenyl phosphinate, bis-(2,6-dimethoxybenzoyl)-2,4,4-trimethylpentylphosphine oxide, bisacylphosphine oxide, methylbenzoyl formate, 4-benzoyl-4'-methyldiphenyl sulfide, benzyl methyl ketal, fluorenone, fluorene, benzaldehyde, benzoin ethyl ether, benzoin propyl ether, Michler's ketone, 2-benzyl-2-dimethylamino-1-(4-morpholinophenyl)-butan-1-one, acetophenone, 3-methylacetophenone, benzophenone, 4,4'-dimethoxybenzophenone, 4,4'-diaminobenzophenone, 3,3',4,4'-tetra (t-butyl peroxycarbonyl) benzophenone (BTTB), acetophenone benzyl ketal, triphenylamine, carbazole, 4-chlorobenzophenone, anthraquinone, xanthone, diethylthioxanthone, 2-isopropylthioxanthone, 4-isopropylthioxanthone, 2-chlorothioxanthone, 1-chloro-4-propoxythioxanthone, and combinations of BTTB and color substance photosensitizers such as xanthene, thioxanthene, cumarin, ketocumarin, or the like. Also, compounds represented by the following formula (XI) may be used.

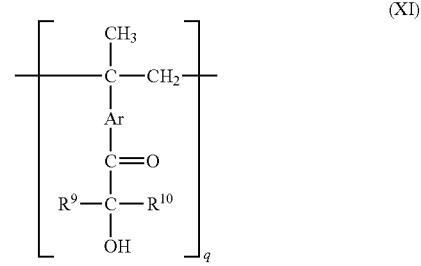

wherein $R^9$ and $R^{10}$ independently represent an alkyl group having from 1 to 5 carbon atoms, Ar represents a divalent aromatic group having 6 to 10 carbon atoms, such as a phenylene group, a biphenylene group, a naphthylene group, or the like, and q denotes an integer from 2 to 50, preferably from 2 to 20.

Examples of the alkyl group in formula (XI) include a methyl group, ethyl group, n-propyl group, i-propyl group, t-butyl group, n-pentyl group, i-pentyl group, and the like. Among these groups, an alkyl group having from 1 to 3 carbon atoms is preferable.

Representative and non-limiting examples of radiation active initiator include benzyl methyl ketal, benzophenone, 1-hydroxycyclohexyl phenyl ketone, 2,4,6-trimethylbenzoyl diphenylphosphine oxides, ethyl-2,4,6-trimethylbenzoylphenyl phosphinate, bis-(2,6-dimethoxybenzoyl)-2,4,4-trimethylpentylphosphine oxides, 2-methyl-1-[4-(methylthio)phenyl]-2-morpholinopropan-1-one, 2-benzyl-2-dimethylamino-1-(4-morpholinophenyl)-butan-1-one, and the like are especially desirable. Also, examples of commercially available products include Irgacure 184, 651, 500, 907, 369, 784, 2959 (manufactured by Ciba-Geigy), Lucirin TPO, LR 8893 (manufactured by BASF), Darocur 1116, 1173 (manufactured by Merck Co.), Ubecryl P36 (manufactured by UCB Co.), ESCACURE KIP150, ESCACURE KIP100F (manufactured by LAMBERTI Co.), and the like. These radiation active initiators may be used either independently or in combinations of two or more.

The amount of component (c) is from 0.1 to 10 parts by weight, more specifically from 0.5 to 8 parts by weight, and even more specifically from 1 to 6 parts by weight, based on the total weight of components (a), (b) and (c).

In one particular embodiment, there are provided silylated resins which are the reaction product(s) of the mercapto-functional silicon compound and/or a partial hydrolyzate or condensate thereof (a) with the reactive resin (b), wherein at least one mercapto group of the mercapto-functional silicon compound and/or partial hydrolyzate or condensate thereof (a) has reacted with at least one of the epoxy group and/or (meth)acrylate group of the reactive resin having at least one epoxy group and/or (meth)acrylate group to form an C—S—C bond.

In another embodiment, the reaction product is form by reacting the mercapto-functional silicon compound and/or the partial hydrolyzate or condensate thereof (a) with the reactive resin having at least one epoxy group (b) at a molar equivalent ratio of the mercapto group, —SH, to the reactive epoxy functional group,

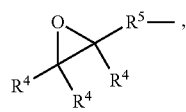

ranging from 0.001 up to 15, more specifically, from 0.002 to 1, even more specifically from 0.1 to 1, or with the reactive resin having at least one (meth)acrylate functional group (b) ranging from 0.001 up to 15, more specifically, from 0.002 to 1, even more specifically from 0.1 to 1.

In still another embodiment, the silylated resin has the general formulae (XII)-(XIII):

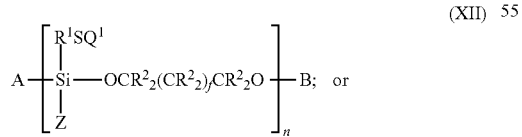
(XII)

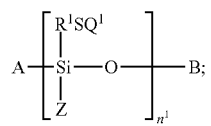
(XIII)

wherein A is —OR$^3$, —OCR$^2_2$(CR$^2_2$)$_f$CR$^2_2$OH or

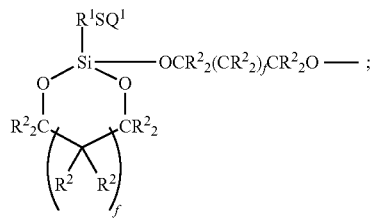

B is H or

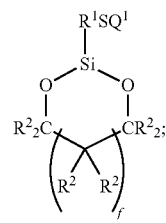

wherein each occurrence of Z is independently selected from the group consisting of
—OR$^3$,
—OCR$^2_2$(CR$^2_2$)$_f$CR$^2_2$OH,

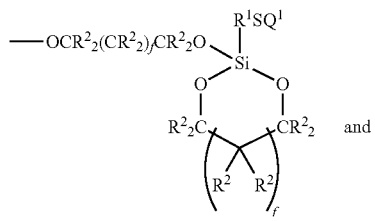 and

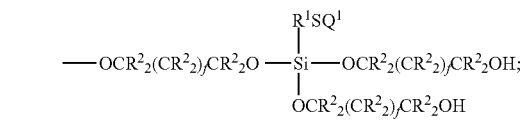

wherein each occurrence of R$^1$ is a divalent group independently selected from the group consisting of alkylene having 1 to 10 carbon atoms, cycloalkylene having from 5 to 12 carbon atoms, phenylene, and aralkyl having 6 to 10 carbon atoms;

wherein each occurrence of R$^2$ is a monovalent group independently selected from the group consisting of alkyl having 1 to 4 carbon atoms and hydrogen;

wherein each occurrence of R$^3$ is independently selected from the group consisting of hydrogen, alkyl having 1 to 12 carbon atoms, a cycloalkyl having 5 to 12 carbon atoms, phenyl and benzyl;

wherein each occurrence of the subscript f is independently an integer from 0 to 4; and wherein the subscript n is an integer from 0 to 15, with the proviso that when n is 0, then B is

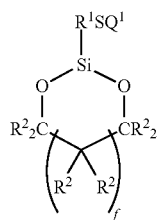

and
and each occurrence of $Q^1$ is hydrogen,

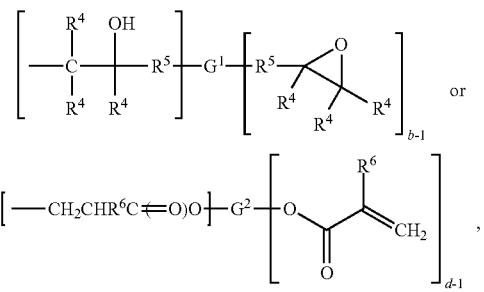

wherein each occurrence of $R^1$, $R^5$, $R^6$, $G^1$, $G^2$, b and d have any of the previous meanings defined above and at least one $Q^1$ is

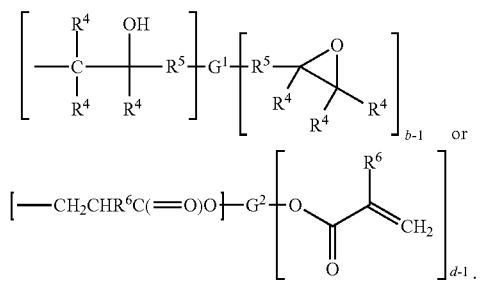

In another embodiment, the silylated resin of the present invention has the general formulae (XIV)-(XV):

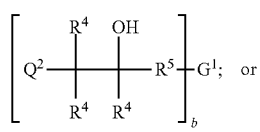 (XIV)

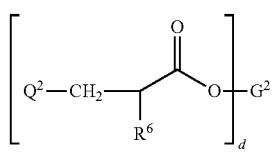 (XV)

wherein each occurrence of $R^4$, $R^5$, $R^6$, $G^1$, $G^2$, b and d are any of the previous meaning given above and $Q^2$ is

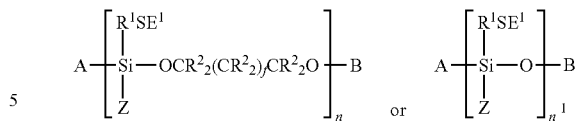

wherein A is $-OR^3$, $-OCR^2_2(CR^2_2)_fCR^2_2OH$, or

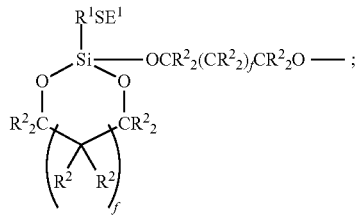

and
B is H, or

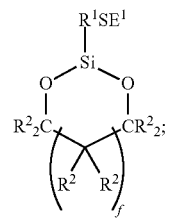

each occurrence of Z is independently selected from the group consisting of
$-OR^3$,
$-OCR^2_2(CR^2_2)_fCR^2_2OH$,

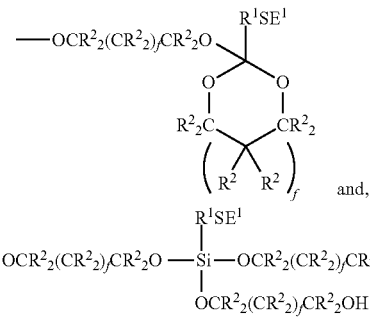

each occurrence of $R^1$ is a divalent group independently selected from the group consisting of alkylene having 1 to 10 carbon atoms, cycloalkylene having from 5 to 12 carbon atoms, phenylene, and aralkyl having 6 to 10 carbon atoms;
each occurrence of $R^2$ is a monovalent group independently selected from the group consisting of alkyl having 1 to 4 carbon atoms and hydrogen;
each occurrence of $R^3$ is independently selected from the group consisting of hydrogen, alkyl having 1 to 12 carbon atoms, a cycloalkyl having 5 to 12 carbon atoms, phenyl and benzyl;
$E^1$ is hydrogen or a chemical bond between the sulfur atom and the carbon atom;
each occurrence of the subscript f is independently an integer from 0 to 4;

the subscript n is an integer from 0 to 15, $n^1$ is an integer from 2 to 15, with the provisos that (i) when n is 0, then B is

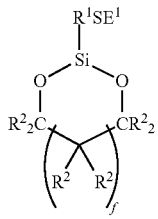

and (ii) only one $E^1$ in the structures for $Q^2$ is a chemical bond.

In a particular embodiment, $Q^2$ is A-B, where A is —$OR^3$, —$CR^2_2(CR^2_2)_fCR^2_2OH$ and B is

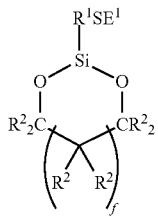

and where $R^1$, $R^2$ and f have any of the meanings defined above, and $E^1$ is a chemical bond between sulfur atom and a carbon atom.

In another particular embodiment, $Q^2$ is

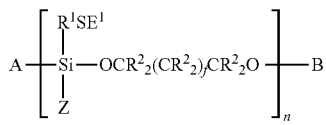

wherein A is —$OR^3$ or —$OCR^2_2(CR^2_2)_fCR^2_2OH$, B is hydrogen, Z is —$OR^3$ or —$OCR^2_2(CR^2_2)_fCR^2_2OH$, $E^1$ is a chemical bond and n is 1, more preferably when A is —$CR^2_2(CR^2_2)_fCR^2_2OH$ and Z is —$OCR^2_2(CR^2_2)_fCR^2_2OH$.

In one embodiment herein there is provided a coating composition comprising the composition comprising the at least one mercapto-functional silicon compound having the general formula (I) (component (a)) and a reactive resin having at least one epoxy group and/or at least one (meth)acrylate group (component (b)). The embodiments described herein for the coating composition and the sealant composition, e.g., the contents thereof and the like apply equally to the instance of compositions which comprise the components (a) and (b), as well as compositions which comprise the silylated resin as described herein.

In one embodiment herein there is provided a silylated resin which is the reaction product of the mercapto-functional silicon compound (a) and the reactive resin (b). In a further embodiment the silylated resin further comprises the curing agent (c) described herein.

One non-limiting example of the reaction product of the mercapto-functional silicon compound (a) and the reactive resin (b) is of the general formula (XVI):

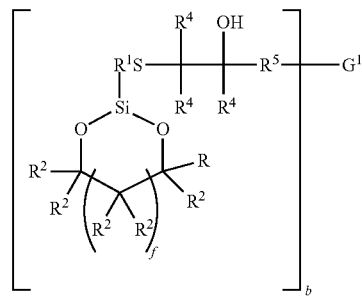

wherein each $R^1$ is independently —$CH_2$—, —$CH_2CH_2$— or —$CH_2CH_2CH_2$—; each $R^2$ is independently hydrogen or methyl; $R^4$ is hydrogen or methyl, $R^5$ is a chemical bond, or a —C(=O)—, —C(=O)O—, —$C_cH_{2c}$— or —$C_cH_{2c}O$— group where the subscript c is an integer of from 1 to 4 and is advantageously 1; $G^1$ has any of the previously meaning above; and b and f are integers where b is 2 to 8 and f is 0 or 1.

In accordance with one embodiment of the present invention, reactive compositions containing the mercapto-functional silicon compound (a) of the general formula (I) and reactive resins (b) are useful in various industrial applications. Illustrative reactive compositions include industrial and architectural coatings, wood coatings, hard coats, adhesion promoting primers for paints or adhesives, UV or EB cured acrylic coatings, acid-epoxy based clearcoats, as described in U.S. Pat. No. 7,053,149, the entire contents of which is incorporated herein by reference, as adhesives and sealants and reinforced composites with fiberglass, carbon, mineral fillers or polyphenylene terephalamide (Kevlar™, E.I. DuPont, Wilm., Del.) reinforcements. As is clear to one of ordinary skill in the art, there is a vast array of applications of the present invention in coating, sealant, adhesives, masonry sealers, fiberglass binders and sizes, inks and other systems that typically use organofunctional silanes and reactive resins, such as epoxy resin and (meth)acrylate resins.

In one non-limiting embodiment herein the low level or decreased levels of VOC's described herein, whether it be in the composition(s) described herein or in the applications thereof, can comprise levels of ≤100 grams/liter, more specifically ≤50 grams/liter, even more specifically ≤20 grams/liter and most specifically ≤10 grams/liter, wherein in one embodiment such ranges can have lower endpoints of any one of 0.01 grams/liter, 0.10 g gram/liter, 0.50 gram/liter and 1 gram/liter.

In one embodiment, volatile organic compounds (VOC's) are defined as organic compounds that have a boiling point at 760 mm Hg (101.325 kilopascal) greater than 180° C., more specifically from 190° C. to 350° C., and even more specifically from 210° C. to 250° C.

The compositions of the present invention have a greatly reduced or avoidance of pungent odors that are typical of mercapto-functional alkoxysilanes due to the high vapor pressure of these silanes. The reduction or avoidance of the pungent odors of the compositions of the present invention is due to the very low vapor pressure of the mercapto-functional silicon compound (a). The pungent odor is reduced or avoided if the vapor pressure of the mercapto-functional silicon compound is less than 0.1 kilopascal, more preferably less than 0.001 kilopascal, and even more preferably, between 0.0001 to 0.00000001 kilopascal at 20° C.

In one embodiment, the vapor pressure of the mercapto-functional silicon compound (a) is measure in accordance with ASTM E-1719-12, Standard Test Method for Vapor Pressure of Liquids by Ebulliometry. More particularly, the vapor pressure of the mercapto-functional silicon compound (a) is measure on the compound after the non-sulfur containing components, such as mono-alcohols and diols that may be present, are removed by stripping the compound at reduced pressures, ranging from 0.13 kilopascal to 15 kilopascal, and more preferably from 0.2 kilopascal to 7 kilopascal, and at elevated temperatures, ranging from 50° C. to 200° C., more preferably from 80° C. to 150° C.

The silylated resin described herein can be used in coatings and sealant formulations, such as the non-limiting examples of moisture-cured coatings and sealants.

In still another embodiment, there is provided a solvent borne or waterborne coating which comprises the mercapto-functional silicon compound (a), a reactive resin (b) containing at least one epoxy and/or (meth)acrylate group, optionally, a curing agent (c).

In one further embodiment, there is provided a waterborne coating which comprises a particulate metal; a surfactant; the silylated resin of the present invention; and, one or more optional ingredients selected from the group consisting of pH adjusting agent, and co-solvent and epoxy alkoxysilane monomer.

According to another embodiment of the present invention, the waterborne coating composition includes the particulate metal in an amount of from about 0.1 to about 80 weight percent, the surfactant in an amount of from about 0.05 to about 10 weight percent, the silylated resin in an amount of from about 0.1 to about 30 weight percent, water in an amount of from about 5 to about 99 weight percent, optional pH adjusting agent, where present, in an amount sufficient to provide a pH of from about 4 to about 6, optional co-solvent, where present, in an amount of from about 0.1 to about 60 weight percent, and optional silane monomer, where present, in an amount of up to about 10 weight percent.

For the purpose of aiding the dispersing of the silylated resin, a pH-adjusting agent is added during the dispersion of the silylated resins in a waterborne system. The pH may be adjusted between 4 to 6. The pH-adjusting agent may be boric acid. According to another embodiment of the present invention, the pH adjusting agent is orthophosphoric acid, acetic acid or citric acid or any other acids that would have no detrimental effects to corrosion protection, e.g., carboxylic acids.

The composition of the present invention may be used in the condition where it is diluted by an organic solvent, as required. There are no limitations on the type of organic solvent provided that it can dissolve components (a), (b) and if present (c). However, the boiling point of the organic solvent is from 50° C. to 350° C., more preferably 60 to 300° C., and even more preferably 180° C. to 250° C. A solvent having a boiling point of less than 50° C. entails a high risk of fire in the course of drying to remove it after the composition of the present invention has been applied. In addition, because such a solvent is apt to be volatile, it is difficult to control the thickness of a coating layer. On the other hand, a solvent having a boiling point exceeding 180° C. scarcely vaporizes so that it is difficult to remove the organic solvent by drying. These solvents will reduce the total VOC's of the compositions. Examples of the organic solvent used in the present invention include alcohols such as methanol, ethanol, isopropyl alcohol, butanol, cyclohexanol and the like, esters such as ethyl acetate, butyl acetate, isoamyl acetate, propionic acid-3-methoxy methyl, and the like, ketone types such as acetone, methyl ethyl ketone, methyl isobutyl ketone, and the like, and aromatic hydrocarbons such as benzene, toluene, xylene, and the like. These solvents may be used either independently or in combinations of two or more. Preferred examples of the dilution solvent include ethanol, isopropyl alcohol, butanol, and mixed solvents of each of these alcohol type solvents and an ester type solvent such as ethyl acetate, butyl acetate, or the like, or an aromatic hydrocarbon such as toluene, xylene, parachlorobenzotrifluoride, octamethylcyclotetrasiloxane, decamethylcyclopentasiloxane, dodecamethylcyclohexasiloxane, or the like.

According to another embodiment of the present invention, co-solvents are added during the dispersion of the silylated resin in a waterborne system. The co-solvent may be dipropylene glycol methyl ether (e.g., Dowanol® DPM available from Dow Chemical) or other glycol ethers as well as alcohols.

According to another embodiment of the present invention, a combination of the pH adjusting agent and co-solvent is added during the dispersion of the silylated resin of the present invention in the formulation of a waterborne system.

According to another embodiment of the present invention, a surfactant is added during the dispersion of the silylated resin in a waterborne system. The surfactant may be either an alkyl-phenol-ethoxylate (APEO) surfactant or an APEO free surfactant. According to another embodiment of the present invention, the surfactant is a cationic, anionic or non-ionic surfactant, or a polyether siloxane-based surfactant or any combination thereof. According to yet another embodiment of the present invention, a surfactant having a hydrophilic-lipophilic balance (HLB) of 13 is used. According to another embodiment of the present invention, the surfactant can be a package of several surfactants with different HLB values ranging from about 5 to about 15 or a package of non-ionic surfactant including a siloxane surfactant. According to another embodiment of the present invention, the surfactant can be selected from the group consisting of alkyl-phenol-ethoxylate surfactant, cationic surfactant, anionic surfactant, non-ionic surfactant, a polyether siloxane-based surfactant and any combination thereof. Specific examples of the surfactants include ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulphates, amide ethoxylates and any combination thereof.

According to another embodiment of the present invention, the silylated resins are used in water borne zinc rich primers or protective coating systems, metallic pigment paste dispersions, a blend of metallic paste dispersion with waterborne latexes or dispersions for primers, coatings or inks, waterborne protective coatings, waterborne shop primers, metallic pigment dispersions and their use in printing ink or coatings, cross linkers of waterborne latexes and dispersions including but not limited to anionic and cationic dispersions, (meth)acrylic resins, and epoxy dispersions, adhesion promoters for same systems described above, additive or binder systems for dispersion of metallic fillers and pigments, pigment dispersion for inorganic fillers such as calcium carbonate, kaolin, clay, etc., waterborne protective coatings using zinc and other metallic pigments as sacrificial pigment, waterborne decorative paints for metal, plastics and other substrates.

According to another embodiment of the present invention, a waterborne coating composition is provided that includes water in an amount from about 5 to about 99 weight percent of the solvent content, a particulate metal, a surfactant and an aqueous medium including a silylated resin of the present invention.

The particulate metal of the coating composition may, in general, be any metallic pigment such as finely divided aluminum, manganese, cadmium, nickel, stainless steel, tin, magnesium, zinc, alloys thereof, or ferroalloys. According to another embodiment of the present invention, the particulate metal is zinc dust or zinc flake or aluminum dust or aluminum flake in a powder or paste dispersion form. The particulate metal may be a mixture of any of the foregoing, as well as comprise alloys and intermetallic mixtures thereof. Flake may be blended with pulverulent metal powder, but typically with only minor amounts of powder. The metallic powders typically have particle size such that all particles pass 100 mesh and a major amount pass 325 mesh ("mesh" as used herein is U.S. Standard Sieve Series). The powders are generally spherical as opposed to the leafing characteristic of the flake.

According to another embodiment of the present invention, the metal particulate is a combination of aluminum and zinc. Where the metal particulate is the combination of zinc with aluminum, the aluminum may be present in very minor amount, e.g., from as little as about 2 to about 5 weight percent, of the particulate metal, and still provide a coating of bright appearance. Usually the aluminum will contribute at least about 10 weight percent of the particulate metal. Thus, frequently, the weight ratio of aluminum to zinc in such a combination is at least about 1:9. On the other hand, for economy, the aluminum will advantageously not contribute more than about 50 weight percent of the zinc and aluminum total, so that the aluminum to zinc weight ratio can reach 1:1. The particulate metal content of the coating composition will not exceed more than about 35 weight percent of the total composition weight to maintain best coating appearance, but will usually contribute at least about 10 weight percent to consistently achieve a desirable bright coating appearance. Advantageously, where aluminum is present, and especially where it is present without other particulate metal, the aluminum will provide from about 1.5 to about 35 weight percent of the total composition weight. Typically, when particulate zinc is present in the composition, it will provide from about 10 to about 35 weight percent of the total composition weight. The metal may contribute a minor amount of liquid, e.g., dipropylene glycol or mineral spirits. Particulate metals contributing liquid are usually utilized as pastes, and these pastes can be used directly with other composition ingredients. However, it is to be understood that the particulate metals may also be employed in dry form in the coating composition.

According to another embodiment of the present invention, the metal particulate can be a corrosion protection filler or pigment such as chromate containing anti corrosive pigments (e.g., zinc chromates and zinc potassium chromates), phosphate containing pigments (e.g., zinc phosphates, alumino triphosphates, calcium magnesium phosphates, barium phosphates, aluminum zinc phosphates, molybdates, wolframates, zirconates and vanadates), metal organic inhibitors like zinc salts of 5-nitrophtalic acid or conductive pigments like iron phosphide.

For the purpose of aiding the dispersion of the particulate metal, a dispersing agent may be added, i.e., surfactant, serving as a "wetting agent" or "wetter", as such terms are used herein. Suitable wetting agents or mixture of wetting agents include nonionic agents such as the nonionic alkylphenol polyethoxy adducts, for example. Also, anionic wetting agents can be employed, and these are most advantageously controlled foam anionic wetting agents. These wetting agents or mixture of wetting agents can include anionic agents such as organic phosphate esters, as well as the diester sulfosuccinates as represented by sodium bistridecyl sulfosuccinate. The amount of such wetting agent is typically present in an amount from about 0.01 to about 3 weight percent of the total coating composition.

It is contemplated that the composition may contain a pH modifier, which is able to adjust the pH of the final composition. Usually, the composition, without pH modifier, will be at a pH within the range of from about 6 to about 7.5. It will be understood that as the coating composition is produced, particularly at one or more stages where the composition has some, but less than all, of the ingredients, the pH at a particular stage may be below 6. However, when the complete coating composition is produced, and especially after it is aged, which aging will be discussed herein below, then the composition will achieve the requisite pH. Where a modifier is used, the pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

According to another embodiment of the present invention, the coating composition may contain what is usually referred to herein as a "boric acid component", or "boron-containing compound". For the "component" or for the "compound", as the terms are used herein, it is convenient to use orthoboric acid, commercially available as "boric acid", although it is also possible to use various products obtained by heating and dehydrating orthoboric acid, such as metaboric acid, tetraboric acid and boron oxide.

The coating composition may also contain thickener. It had previously been considered that thickener was an important ingredient, as discussed in U.S. Pat. No. 5,868,819, the entire content incorporated herein by reference. It has, however, now been found that serviceable coating compositions can be produced which do not contain a thickener, and desirable coating composition characteristics such as storage stability can nevertheless be achieved. For the present invention, the thickener is thus an optional substituent. The thickener, when present, can contribute an amount of between about 0.01 to about 2.0 weight percent of the total composition weight. This thickener can be water soluble cellulose ether, including the "Cellosize" (trademark) thickeners. Suitable thickeners include the ethers of hydroxyethylcellulose, methylcellulose, methylhydroxypropylcellulose, ethylhydroxyethylcellulose, methylethylcellulose or mixtures of these substances. Although the cellulose ether needs to be water soluble to augment thickening of the coating composition, it need not be soluble in the organic liquid. When thickener is present, less than about 0.02 weight percent of the thickener will be insufficient for imparting advantageous composition thickness, while greater than about 2 weight percent of thickener in the composition can lead to elevated viscosities which provide compositions that are difficult to work with. According to an embodiment of the present invention, for thickening without deleterious elevated viscosity, the total composition will contain from about 0.1 to about 1.2 weight percent of thickener. It will be understood that although the use of a cellulosic thickener is contemplated, and thus the thickener may be referred to herein as cellulosic thickener, some to all of the thickener may be another thickener ingredient. Such other thickening agents include xanthan gum, associative thickeners, such as the urethane associative thickeners and urethane-free nonionic associative thickeners, which are typically opaque, high-boiling liquids, e.g., boiling above 100° C. Other suitable thickeners include modified clays such as highly beneficiated hectorite clay and organically modified and activated smectite clay. Still other suitable thickeners include cellulose acetate butyrates and polyamide wax thickeners. When the thickeners are used, the thickeners are usually grind paste intermediates and are usually added early in the production of the paint in order to avoid the thickeners from seeding out.

The coating composition may contain further additional ingredients in addition to those already enumerated hereinabove. These other ingredients may include phosphates. It is to be understood that phosphorous-containing substituents, even in slightly soluble or insoluble form, may be present, e.g., as a pigment such as ferrophos. The additional ingredients will frequently be substances that can include inorganic salts, often employed in the metal coating art for imparting some corrosion-resistance or enhancement in corrosion-resistance. Materials include calcium nitrate, dibasic ammonium phosphate, calcium sulfonate, 1-nitropropane lithium carbonate (also useful as a pH modifier), or the like, and, if used, these are most usually employed in the coating composition in a total combined amount of from about 0.1 to about 2 weight percent. Greater than about 2 weight percent of such additional ingredient may be utilized where it is present for a combination of uses, such as lithium carbonate used as a corrosion-inhibitor and also as a pH adjusting agent. Most usually the coating composition is free from these further additional ingredients.

In another embodiment of the present invention, the formulation may include, when necessary, a surface active agent for reducing foam or aiding in de-aeration. The de-foamer and de-aerator agent may include mineral oil based material, silicone-based material, a polyether siloxane or any combination thereof. The concentration of the surface active agents can be adjusted to in the range from about 0.01 weight percent to about 5 weight percent of active material. The active material is the sum of the weights of mercaptofunctional silicon compound (a), the reactive resin (b), and if present, the curing agent (c). The surface active agents may be used as a pure material or as a dispersion in water or any other appropriate solvent to disperse them into the final waterborne composition.

The coating composition may also contain surface effect agents for modifying a surface of the coating composition such as increased mar resistance, reduced coefficient of friction, flatting effects, and improved abrasion resistance. Examples may include silicone polyether copolymers such as e.g., Silwet® L-7608 and other variants available from Momentive Performance Materials.

Typical crosslinkers can also be utilized in the coating composition of the present invention. For example, the crosslinker can be epoxy curing agents, amino agents, aminoamido agents, epoxy amino adducts, melamines, anhydrides, polycarboxylic anhydrides, carboxylic acid resins, aziridines, organofunctional silanes, etc.

The additives discussed above can be added at any stage of the use of a silylated resin produced in accordance with the present or in any of the different steps of the production of a waterborne composition produced in accordance with the present invention.

The coating formulation may also contain corrosion inhibitors. Examples of inhibitors may include chromate, nitrite and nitrate, phosphate, tungstate and molybdate, or organic inhibitors include sodium benzoate or ethanolamine.

According to another embodiment of the present invention, the formulations discussed herein using a silylated resin of the present invention may be chrome-free. According to another embodiment of the present invention, it may be desirable to prepare a chrome-containing formulation using a silylated resin of the present invention. Such chrome-containing anti-corrosion pigments are for example zinc chromates like zinc potassium chromates and zinc tetrahydroxychromates. Other anti-corrosive pigments may include molybdates, wolframates, zirconates, vanadates, zinc phosphates, chromium phosphates, aluminum triphosphates, barium phosphates, and aluminum zinc phosphates. Such anti-corrosive pigments may also be combined with an organic corrosion inhibitor like zinc salt, e.g., 5-nitrophtalic acid.

Alternatively, a waterborne composition of the present invention is provided which comprises a dispersion of a particulate metal in an aqueous solution including at least one silylated resin as described herein above with one or more optional ingredients selected from the group consisting of a surfactant, pH adjusting agent, co-solvent, monomeric silane, binder, and any other ingredients typically employed in coatings, e.g., thickeners, crosslinkers, etc.

The binder can be an inorganic and/or an organic binder. The inorganic binder can be a silicate, ethyl silicate, silica nano particles solution or silicone resin.

The organic binder can be vinylic resins, polyvinyl chlorides, vinyl chloride copolymers, vinylacetate copolymers, vinylacetates copolymers, acrylics copolymers, styrene butadiene copolymers, acrylate, acrylate copolymer, polyacrylate, styrene acrylate copolymers, phenolic resins, melamine resins, epoxy resins, polyurethane resins, alkyd resins, polyvinyl butyral resins, polyamides, polyamidoamines resins, polyvinyl ethers, polybutadienes, polyester resins, organosilicone resin, organopolysiloxane resin and any combinations thereof. Natural binders such as cellulosic derivatives like nitrocellulosic resins, carboxymethyl cellulose, cellulose esters of organic acids, cellulose ethers like hydroxymethyl or ethyl cellulose, modified natural rubbers, natural gums or solution forms of said polymers and copolymers.

The organic binders can also be a non-ionic stabilized resin, an anionic stabilized emulsion or a cationic stabilized emulsion.

The coating composition can be formulated in a variety of procedures. For example, as an alternative to directly using the silylated resin, in accordance with the present invention above, the silylated resin may used as a binding agent in a concentrated form or as a more dilute premixture of the silylated resin, such as the silylated resin is mixed with a diluent. The diluent may be selected from the substituents providing the coating composition liquid medium, such as water, or water plus boric acid component, or water plus low-boiling organic liquid including acetone. Additionally, it is contemplated that the silylated resin binding agent may initially be mixed together with any of the other necessary composition ingredients. Hence, the silylated resin in a liquid form, such as in a diluent, may be mixed with other coating composition ingredients which are in solid or liquid form. However, it will most always be present in any composition before a particulate metal is added to that composition.

In addition, the silylated resins, in accordance with the present invention discussed above may be incorporated in many different formulations having many different uses. For instance, in accordance with an exemplary embodiment of the present invention, a waterborne composition is provided which comprises at least one silylated resin made in accordance with present invention describe above herein with one or more optional ingredients selected from the group consisting of a surfactant, pH adjusting agent, co-solvent, monomeric silane, binder, crosslinker and pigment paste dispersion. The silylated resin, in a first embodiment, can be present in the range of about 0.05 to about 40 weight percent of the composition, in a second embodiment in the range of about 0.1 to about 20 weight percent of the composition, in a third embodiment in the range of about 0.1 to about 10 weight percent of the composition, in a fourth embodiment in the range of about 0.5 to about 10 weight percent of the composition.

Packaging concepts, as well as formulation considerations for how the coating composition is prepared, can be taken into consideration when bringing composition ingredients together. Thus, it is contemplated that less than all of the coating composition ingredients may be present in other composition premixtures. Such can include, for example, a wetting agent, or a wetting agent plus a boric acid component, or an aqueous medium plus a boric acid component. Such premixtures may be made up with liquid which may or may not include the aqueous medium, and may or may not include an organic liquid.

Even considering storage stability, the composition may be a one-pack formulation of all coating composition ingredients or a two-pack formulation. It will be understood that the final coating composition, as well as separate pre-blended packages, may be prepared in concentrated form.

Where particulate aluminum will be used in the coating composition, and especially where both particulate zinc and particulate aluminum will be employed, a variant of the above packaging considerations may be utilized. According to another embodiment of the present invention, it is desirable to use a zinc and aluminum combination and to start with a mixture, susceptible to packaging, of about 0.1 to 15 percent wetting agent, about 0.1 to 5 percent boric acid component, about 0.5 to 35 percent silane binding agent and a balance of aqueous medium to provide 100 weight percent total mixture weight. Into this mixture, there then can be dispersed particulate metal, usually as a flake, e.g., zinc flake. Additional aqueous medium may be added, whereby the resulting metal-containing dispersion can contain about 25 to about 45 weight percent of the particulate metal and from as much as about 40, up to about 60, weight percent aqueous medium, both basis the total weight of the resulting metal-containing dispersion.

Typically, there is then separately prepared an additional package precursor blend to introduce the particulate aluminum into the final coating composition. This particulate aluminum will generally be aluminum flake, but it is to be understood that other metals in flake form, e.g., zinc flake, may be present with the aluminum.

Even when made as a one-package formulation, the final coating composition has highly desirable storage stability. This confirms the binding ability of the silylated resins, in accordance with the present invention, to protect the particulate metal from deleterious reaction with other composition ingredients during extended storage. Such extended shelf stability was unexpected, owing to the recognized reaction problems of particulate metal in water-reducible systems, e.g., hydrogen gas evolution from aqueous compositions containing particulate zinc. However, even after storage as a single package, compositions of the present invention can be unpackaged, prepared for coating application as by brisk stirring, then readily applied. Resulting coatings can have the desirable corrosion-resistance, and often the other coating characteristics, of coatings applied from freshly prepared compositions.

In one embodiment, when a bath of the coating composition has been prepared, then it may desirable to age this blend. Aging can help provide better coating performance. Usually, aging of the blend will be for at least 1 hour, and advantageously for at least about 2 hours to about 7 days, or more. Aging for less than 1 hour can be insufficient for developing desirable bath characteristics, whereas aging for greater than 7 days can be uneconomical.

The final coating composition, whether freshly prepared or after storage, may be applied by various techniques, such as immersion techniques, including dip coating methods such as dip drain and dip spin procedures. Where parts are compatible with same, the coating can be applied by spray coating, flow coating, curtain coating, brush coating, roller coating and screen printing methods, and including combinations of the foregoing. It is also contemplated to use spray technique as well as combinations, e.g., spray and spin and spray and brush techniques. Coated articles that are at an elevated temperature may be coated, often without extensive cooling, by a procedure such as dip spin, dip drain or spray coat.

The coated (e.g., protected) substrate can be any substrate, e.g., a ceramic or similar substrate, but is most particularly a metal substrate such as a zinc or iron, e.g., steel, e.g., cold rolled steel, substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form. Especially where such are metal substrates, which are most usually ferrous substrates, these may be pretreated, e.g., by chromate or phosphate treatment, prior to application of the undercoating. Thus, the substrate may be pretreated to have, for example, an iron phosphate coating in an amount from about 50 milligrams per square foot to about 100 milligrams per square foot ($mg/ft^2$) or a zinc phosphate coating in an amount from about 200 to about 2,000 milligrams per square foot.

In another embodiment, these methods generally provide a layer of the composition to the substrate which results in a cured coating having a thickness in a range from 0.1 micrometer (μm) to 50 micrometers, preferably from 1 to 10 micrometers. More preferably, the thickness of the cured coating is 3 micrometers or greater. After the composition of the present invention has been applied, the composition is typically dried at a temperature usually from 0 to 200° C., preferably from 20 to 150° C., and more preferably from 40 to 100° C., for 1 second to 24 hours, preferably 10 seconds to 1 hour, to remove volatile components as required, followed by exposure to radiation to cure the composition.

For the substrates containing applied coating composition, the subsequent curing of the composition on the substrate will usually be a hot air oven cure, although other curing procedures can be used, e.g., infrared baking and induction curing. In another embodiment, the coating composition will be heat-cured at an elevated temperature, e.g., on the order of about 450° F., but usually greater, oven air temperature. The cure will typically provide a substrate temperature, usually as a peak metal temperature, of at least about 450° F., oven air temperatures may be more elevated, such as on the order of 650° F., but for economy, the substrate temperature need not exceed about 450° F. Curing, such as in a hot air convection oven, can be carried on for several minutes. Although cure times may be less than 5 minutes, they are more typically on the order of from about 10 to about 40 minutes. It is to be understood that cure times and temperatures can be affected where more than one coating is applied or where a subsequently applied, heat-cured topcoating will be used. Thus, shorter time and lower temperature cures can be employed when there will be applied one or more additional coatings or a topcoating that proceeds through an elevated temperature bake at a longer cure time. Also, where more than one coating is applied or a heat-curable topcoating will be applied, the first coating or undercoating, may need only be dried, as discussed hereinabove. Then, curing can proceed after application of a second coating, or of a heat-cured topcoating, often referred to as wet-on-wet coating application. In refinished technologies, the cure is from room temperature to about 60° C. In automotive parts and accessories, the cure temperature typically ranges from 48° C. to 82° C. for low bake plastics and from 83° C. to 121° C. In original equipment materials, typical curing temperatures (high bake) are from 93° C. to 140° C. for metals. Coil and extrusion coating are typically cure at temperature above 148° C.

The resulting weight of the coating on the metal substrate may vary to a considerable degree, but will always be present in an amount supplying greater than 500 milligrams per square foot (mg/ft$^2$) of coating. A lesser amount will not lead to desirably enhanced corrosion-resistance. Advantageously, a coating of greater than about 1,000 milligrams per square foot of coated substrate will be present for best corrosion-resistance, while most typically between about 2,000 to 5,000 milligrams per square foot of coating will be present. In this coating, there will generally be present from about 400 milligrams per square foot to about 4,500 milligrams per square foot of metal.

In another embodiment, it is desirable to use UV rays for radiation for the purpose of curing the composition of the present invention. The UV rays to be used generally include those with a wave length of 400 nanometers (nm) or less. As a light source, for example, a metal halide lamp or a mercury lamp (which may be a high pressure type, medium pressure type, or low pressure type) may be used at a dose of from 0.01 to 10 joules per centimeter (J/cm), preferably from 0.1 to 3 joules per centimeter (J/cm).

Before use, the coated substrate may be topcoated, e.g., with silica substance. The term "silica substance", as it is used herein for the topcoating, is intended to include both silicates and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of the above-discussed water-soluble cellulose ethers. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to include true solutions and hydrosols. The preferred inorganic silicates are the aqueous silicates that are the water-soluble silicates, including sodium, potassium, lithium and sodium/lithium combinations, as well as other related combinations.

Other ingredients may be present in the silica substance topcoating composition, e.g., wetting agents and colorants, and the composition may contain chrome substituents if desired, but can be chrome-free as defined hereinabove to provide a totally chrome-free coating. Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

By any coating procedure, the topcoat should be present in an amount above about 50 milligrams per square foot (mg/ft$^2$) of coated substrate. For economy, topcoat weights for cured topcoating will not exceed about 2,000 milligrams per square foot of coated substrate. This range is for the cured silica substance topcoating. Preferably, for best coating efficiency and silica substance topcoat economy, the topcoat is an inorganic silicate providing from about 200 to about 800 milligrams per square foot of cured silicate topcoating.

For the silica substance topcoat curing, it is typical to select the curing conditions in accordance with the particular silica substance used. For the colloidal silicas, air drying may be sufficient; but, for efficiency, elevated temperature curing is preferred for all the silica substances. The elevated temperature curing can be preceded by drying, such as air drying. Regardless of prior drying, a lower cure temperature, e.g., on the order of about 65° C. to about 149° C., will be useful for the colloidal silicas and organic silicates. For the inorganic silicates, curing typically takes place at a temperature on the order of about 149° C. to about 260° C. In general, cure temperatures on the order of from about 65° C. to about 427° C. or more, as peak metal temperatures, may be useful. At the more elevated temperatures, cure times may be as fast as about 10 minutes, although longer cure times, up to about 20 minutes, are more usual. Also, articles can be topcoated with the silica substance topcoat while the articles are at elevated temperature, as from the curing of the water-reducible coating composition. Such could be done as by spray coat or dip drain, i.e., a dipping of the elevated temperature article into the topcoat composition, which can provide a quenching of the article. Upon removal from the topcoating composition, the article can be drained. Some to all of the topcoat curing can be achieved by the operation.

Before use, the coated substrate with the coating from the water-reducible coating composition may also be further topcoated with any other suitable topcoating, i.e., a paint or primer, including electrocoating primers and weldable primers, such as the zinc-rich primers that may be typically applied before electrical-resistance welding. Topcoating paints may contain pigment in a binder or can be unpigmented, e.g., generally cellulose lacquers, resin varnishes, and oleoresinous varnishes, as for example tung oil varnish. The paints can be solvent-reduced or they may be water-reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxies, acrylics, vinyl, including polyvinyl butyral, and oil-wax-type coatings such as linseed oil-paraffin wax paints.

Of special interest, the coated substrate with the coating from the water-reducible coating composition can form a particularly suitable substrate for paint deposition by electrocoating. The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Suitable topcoating compositions may be pigmented dispersions or emulsions. These can include copolymer dispersions in liquid medium as well as aqueous emulsions and dispersions of suitable waxes. Articles can be topcoated in these compositions, which articles are at elevated temperature such as after curing of the applied water-reducible coating, by procedures including a dip-drain or a spray coating operation. By such quench coating operation, all of the topcoating curing may be achieved without further heating.

Before coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching, or cleaning plus shot blasting.

Further, the organic and inorganic binders can be cured with an external crosslinker(s) such as isocyanates, epoxy curing agents, amino or aminoamido agents, epoxy amino adducts, carbodiimides, melamines anhydrides polycarboxylic anhydrides and carboxylic acid resins, aziridines, titanates, organofunctional titanates, organofunctional silanes such as epoxy silanes, aminosilanes, isocyanatosilanes, methacryl silanes, vinylsilanes.

In yet another embodiment herein, sealant compositions can be obtained from the above described silylated polymers by thoroughly mixing together the silylated polymer described above and inorganic filler and optionally, a cure catalyst, and one or more optional conventional functional adjuvants such as plasticizers, thixotropes, antioxidants, U.V. stabilizers and adhesion promoter(s). Effective mixing of the various components can be achieved using a double planetary mixer (batch approach). However, the sealant can also be manufactured using a continuous process. Typically, the silylated polymer, fillers, stabilizers and plasticizers are mixed at about 60° C. for about 60 to about 90 minutes. After cooling to about 50° C., the desired silane adhesion promoter, dehydrating agent and cure catalyst are added and the mixture is stirred for about 30 minutes.

Examples of inorganic filler particles include silica particles, glass particles, alumina, magnesium carbonate, calcium carbonate, calcium phosphate, aluminum hydroxide, talc, titanium oxide, and the like are given. Among these, silica particles, glass particles, calcium carbonate, and talc are desirable. The silica particles are commercially available under the trademarks of Nipsil E220A, E220, K300, E1011, HD, E743, SS-10F, SS-178B (manufactured by Nippon Silica Industrial Co., Ltd.), Sildex H31, H32, L-31 (manufactured by Asahi Glass Co., Ltd.), SO-E2, SO-E3, SO-E5 (manufactured by Admatechs Co., Ltd.), and the like.

Talc is commercially available under the trademarks of LMS-300, LMS-200, LMS-100, LMP-100, LMG-100, LMR-100, PKP-53 (manufactured by Fuji Talc Industrial Co., Ltd.). Calcium carbonate is commercially available under the trademarks of Calcies, Calcies-P, PL, —X, Star Brand slightly micro-calcium carbonate (manufactured by KONOSHIMA CHEMICAL Co., Ltd.). These inorganic particles may be used either singly or in combinations of two or more.

The proportion of the inorganic particles, when the amount of silylated resin of the present invention or the total weight of the composition of the mercapto-functional silicon compound (a) and reactive resin (b) containing at least one epoxy and/or (meth)acrylate group is 100 parts by weight, is preferably from 0.2 to 5 parts by weight and more preferably from 0.3 to 2 parts by weight. If the proportion of the inorganic particles is less than 0.1 parts by weight, the resistance to fingerprint adhesion and surface sliding properties are insufficient.

The plasticizers typically employed in this field are suitable for use in the present invention to increase elongation to facilitate use of a higher filler levels. Exemplary plasticizers include phthalates, dipropylene and diethylene glycol dibenzoates and mixtures thereof, epoxidized soybean oil and the like. Useful sources of dioctyl and diisodecylphthalate may include those available under the trade names Jayflex® DOP and Jayflex® DIDP from ExxonMobil Chemical. The dibenzoates are available as Benxoflex® 9-88, Benxoflex® 400 from Velsicol Chemical Corporation. The plasticizer is typically present, in a first embodiment, in an amount up to about 100 parts per 100 parts of the silylated resin of the present invention or the total weight of the composition of the mercapto-functional silicon compound (a) and reactive resin (b) containing at least one epoxy and/or (meth)acrylate group, in a second embodiment in an amount of about 40 to about 80 parts per 100 parts of the silylated resin of the present invention or the total weight of the composition of the mercapto-functional silicon compound (a) and reactive resin (b) containing at least one epoxy and/or (meth)acrylate group.

The sealant compositions of the present invention typically incorporate U.V. and/or antioxidants, in a first embodiment, in an amount ranging from about 0 to about 5 parts per 100 parts silylated resin of the present invention or the total weight of the composition of the mercapto-functional silicon compound (a) and reactive resin (b) containing at least one epoxy and/or (meth)acrylate group, in a second embodiment, in an amount ranging from about 0.5 to about 2.0 parts per 100 parts silylated resin of the present invention or the total weight of the composition of the mercapto-functional silicon compound (a) and reactive resin (b) containing at least one epoxy and/or (meth)acrylate group. Representative additives include but are not limited to Tinuvin® 770, Tinuvin® 327, Tinuvin® 213, Tinuvin® 622 and Irganox®1010. These stabilizers can be used alone or in combination.

Suitable curing agents (c) when the curing agents are catalysts include are Bronsted acids, Bronsted bases, Lewis acids, Lewis bases, and metal catalysts. In accordance with another embodiment of the present invention, the cure catalyst can be a metal catalyst selected from the group consisting of tin, bismuth, zirconium, or titanium. But in one non-limiting embodiment the cure catalyst can be other than a tin-catalyst, or in the absence of a tin catalyst.

The various thixotropic or anti-sagging agents include various castor waxes, fumed silica, treated clays and polyamides. These additives typically comprise about 1 to about 10 parts per hundred parts of the silylated resin of the present invention or the total weight of the composition of the mercapto-functional silicon compound (a) and reactive resin (b) containing at least one epoxy and/or (meth)acrylate group. According to another embodiment of the present invention, these additives comprise about 1 to about 6 parts per hundred parts of the silylated resin of the present invention or the total weight of the composition of the mercapto-functional silicon compound (a) and reactive resin (b) containing at least one epoxy and/or (meth)acrylate group. The thixotrope includes those available as: Aerosil® from Degussa, Cab-O-Sil® TS 720 from Cabot, Castorwax® from CasChem, Thixatrol® and Thixcin® from Rheox and Disparlon® from King Industries.

The sealant composition of the present invention may comprise other additives. Examples of these other additives include polymer or oligomer such as an epoxy resin, acryl resin, a polymer of an acryl group-containing monomer and N-vinyl pyrrolidone, urethane acrylate, vinyl ether, propenyl ether, polymerizable compounds such as maleic acid derivatives, polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, acryl group-containing resin having styrene as a main chain component, petroleum resin, xylene resin, ketone resin, fluorine-containing oligomer, silicone-containing oligomer, and polysulfide type oligomer. Although the mixing order of each component in the production of the present invention is not essential, it is desirable in view of ease of operation and dispersion of inorganic particles, to add the inorganic particles to a mixture of components (a), (b) and if present (c), and the above optional components added as required and to stir the resulting mixture until the inorganic particles are uniformly dispersed. The viscosity at 25° C. of the resulting composition is generally from 1 to 10,000 mPa-s, preferably from 5 to 1,000 mPa-s.

According to another embodiment of the present invention, after mixing, the sealants may be cured at about 23° C. and at about 50% relative humidity for 3 days and at about 37° C. and at about 95% relative humidity for another 4 days. The physical properties of the cured sealant are then determined by tensile, tear and elongation tests using American Society for Testing and Materials (ASTM) Methods D 412 and D 624.

The silylated polymers of this invention vulcanize or cure into a cross-linked, three-dimensional network upon exposure to moisture (water vapor, liquid water, aqueous systems, etc.). The cure rate is dependent on atmospheric temperature, relative humidity, and the like. According to another embodiment of the present invention, the silylated polymer is employed in the form of a sealant composition comprising the silylated polymer and a catalyst to facilitate the crosslinking, or vulcanization, of the silylated polymer. These compositions form part of this invention.

There is also provided a moisture-curable sealant composition which comprises the moisture-curable polymer and at least one filler. The curing of the moisture-curable sealant upon exposure to moisture, e.g., atmospheric moisture, results in a cured sealant. In one specific embodiment herein there is provided a moisture-curable sealant composition comprising the mercapto-functional silicon compound (a) of the general formula (I) and the reactive resin (b) containing at least one epoxy and/or (meth)acrylate or the reaction product of component (a) and (b) to form a silylated resin, and the resulting cured sealant.

The silylated resin of the present invention and/or the reactive composition of the mercapto-functional silicon compound (a) and reactive resin (b) containing at least one epoxy and/or (meth)acrylate group of the present invention are also useful as adhesion promoters for the sealant compositions in which the ability to adhere to another surface is highly desirable. In this application the silylated resin of the present invention and/or the composition of the mercapto-functional silicon compound (a) and reactive resin (b) containing at least one epoxy and/or (meth)acrylate group is typically added during the later stages of the compounding of the sealant or adhesive compositions. These materials are typically employed, in a first embodiment, at levels of about 0.25 to about 5 by weight percent of the composition, in a second embodiment at levels of about 0.50 to about 2.5 weight percent of the composition, in a third embodiment at 0.8 to 1.5 weight percent of the composition, where the weights for the reactive composition of components (a) and (b) and based on the total weight of these two components.

In addition to the silylated resin of the present invention and/or the composition of the mercapto-functional silicon compound (a) and reactive resin (b) containing at least one epoxy and/or (meth)acrylate group of the present invention, suitable other adhesion promoters may include, but are not limited to Silquest® A-1120 silane, Silquest® A-2120 silane, Silquest® A-1170 silane and Silquest® A-187 silane available from Momentive Performance Materials.

In accordance with another exemplary embodiment of the present invention, a sealant composition is provided which comprises a silylated resin of the present invention and/or reactive composition of the mercapto-functional silicon compound (a) and reactive resin (b) containing at least one epoxy and/or (meth)acrylate group as adhesion promoter which upon hydrolysis produces a reduced amount of volatile organic compound compared to that produced by the hydrolysis of a silane possessing an equivalent number of hydrolyzable sites all of which are hydrolyzable alkoxy groups, and one or more optional ingredients selected from the group consisting of thixotropic agent, plasticizer, stabilizer, pigment and filler.

In accordance with yet another exemplary embodiment of the present invention, a sealant composition is provided which comprises a silylated resin of the present invention and/or the composition of the mercapto-functional silicon compound (a) and reactive resin (b) containing at least one epoxy and/or (meth)acrylate group, and a catalyst, which upon hydrolysis produces a reduced amount of volatile organic compound compared to that produced by the hydrolysis of a silane possessing an equivalent number of hydrolyzable sites all of which are hydrolyzable alkoxy groups, and one or more optional ingredients selected from the group consisting of thixotropic agent, plasticizer, stabilizer, pigment and filler.

The silylated resin of the present invention and/or the reactive composition of the mercapto-functional silicon compound (a) and reactive resin (b) containing at least one epoxy and/or (meth)acrylate group of this invention are useful in caulking and sealing applications on buildings, airplanes, bathroom fixtures, automotive equipment or wherever elastomeric polymers with improved elongation and flexibility are desired. Another desirable feature of these silylated resin and/or the composition of the mercapto-functional silicon compound (a) and reactive resin (b) containing at least one epoxy and/or (meth)acrylate group is their ability to be applied to moist or wet surfaces and be cured into a cross-linked elastomer without deleterious effects, which cured product becomes tack-free within a relatively short period of time. Moreover, the cured polymers of this invention strongly adhere alone or with the aid of a primer to a wide variety of substrates such as glass, porcelain, wood, metals, polymeric materials and the like making them especially suited for any type of caulking, adhesive or laminating application.

In one embodiment, the silylated resin of the invention contain no more than about 5 percent by weight silicon based upon total solids content. In another embodiment the silylated polymer of the invention contains no more than about 2 percent by weight of silicon based upon total solids content. In yet another embodiment the silylated polymer of the invention contains no more than about 1 percent by weight of silicon based upon total solids content.

According to another embodiment of the present invention, the molar ratio of water to silylated resin of the present invention and/or the composition of the mercapto-functional silicon compound (a) and reactive resin (b) containing at least one epoxy and/or (meth)acrylate group is from about 0.1 to about 1.5. According to yet another embodiment of the present invention, the molar ratio of water to silylated resin of the present invention and/or the composition of the mercapto-functional silicon compound (a) and reactive resin (b) containing at least one epoxy and/or (meth)acrylate group is from about 0.4 to about 1.0. According to still yet another embodiment of the present invention, the molar ratio of water to silylated resin of the present invention and/or the composition of the mercapto-functional silicon compound (a) and reactive resin (b) containing at least one epoxy and/or (meth)acrylate group is less than about 0.5. When water is added to the silylated resin of the present invention and/or the composition of the mercapto-functional silicon compound (a) and reactive resin (b) containing at least one epoxy and/or (meth)acrylate group, partial hydrolyzates and/or condensates are formed.

The cured polymers of this invention provide a combination of the desirable properties such as tear resistance, extensibility, elastic recovery, and the like, while at the same time providing the desirable properties of improved elongation and flexibility and lower modulus of elasticity. Improved elongation and lower modulus of elasticity, e.g., can significantly reduce the stresses on polyurethane sealants at the interface of the substrate during expansions and contractions of joints. These properties help to minimize adhesive failure of the sealants.

In one further embodiment herein there is provided an ink composition comprising silylated resin of the present invention and/or the composition of the mercapto-functional silicon compound (a) and reactive resin (b) containing at least one epoxy and/or (meth)acrylate group.

The mercapto-functional silicon compound of the general formula (I) herein may be prepared by transesterification of mercapto-functional alkoxy-substituted silanes and diols with or without a catalyst, by the esterification of mercapto-functional silyl halides with diols, or by the hydrosilylation of mercapto-substituted alkenes with a hydrosilane containing a heterocylic silicon group to generate the mercapto-functional silicon compound of the general formula (I).

The transesterification of mercapto-functional alkoxy-substituted silanes and diols may be conducted with or without a catalyst. The catalyst may be an acid, a base or a transition metal catalyst. Suitable acid catalysts are hydrochloric acid, p-toluenesulfonic acid and the like. Typical base catalysts are sodium methoxide, sodium ethoxide. Suitable transition metal catalysts are tetraisopropyl titanate, dibutyltin dilaurate.

In another embodiment of the present invention, the mercapto-functional silicon compound of formula (I) can be prepared by reacting a catalyzed mixture of mercapto-functional silane reactant and diol with simultaneous distillation. The reaction leads to the alcohol exchange of one or more of the alkoxy groups selectively at the silicon atom of the mercapto-functional silane reactant with the diol. The reaction is driven by the removal of the more volatile by-product alcohol by distillation. Suitable catalysts include acids such as p-toluenesulfonic acid, sulfuric acid, hydrochloric acid, chlorosilanes, chloroacetic acids, phosphoric acid, their mixtures, and so forth; bases such as sodium ethoxide; and, transition metal-containing catalysts such as titanium alkoxides, titanium-containing chelates, zirconium alkoxides, zirconium-containing chelates and mixtures thereof.

In yet another embodiment of the present invention, the mercapto-functional silicon compound of formula (I) can be prepared by catalyzing a mixture of mercapto-functional silane and diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10'C to about 150° C. and in another embodiment from about 30'C to 90° C. while maintaining a pressure in the range of from about 0.013 kilopascal to about 266 kilopascal, and in another embodiment, from about 0.13 kilopascal to about 10.6 kilopascal. Excess diol can be utilized to increase reaction rate.

In another embodiment the mercapto-functional silicon compound of formula (I) can be prepared by slowly adding diol to mercapto-functional silane in the presence of catalyst at the desired reaction temperature and under vacuum. If desired, a neutralization step may be utilized to neutralize any acid or base catalyst that may have been utilized thereby improving product storage.

Optionally, an inert solvent may be used in the process. The solvent may serve as a diluent, carrier, stabilizer, refluxing aid or heating agent. Generally, any inert solvent, i.e., one which does not enter into the reaction or adversely affect the reaction, may be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride, and so forth.

In another embodiment of the present invention, the mercapto-functional silicon compound of formula (I) can be prepared by continuously premixing the flow-streams of mercapto-functional silane reactant, diol, and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:
 a) reacting, in a thin film reactor, a thin film reaction medium comprising mercapto-functional alkoxysilane, diol and catalyst to provide diol-derived mercapto-functional silane and by-product alcohol;
 b) vaporizing the by-product alcohol from the thin film to drive the reaction;
 c) recovering the mercapto-functional silicon compound of formula (I) reaction product;
 d) optionally, recovering the by-product alcohol by condensation; and,
 e) optionally, neutralizing the mercapto-functional silicon compound of formula (I) product to improve its storage stability.

The molar ratio of diol to mercapto-functional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to mercapto-functional silane can be varied within a range of from about 95 to about 125 percent of stoichiometric equivalence for each alkoxy-silyl group to be transesterified. In a particular embodiment, the molar ratio of diol to mercapto-functional silane can be within the range of from about 100 to about 110 percent of stoichiometric equivalence. In another embodiment, the molar ratio can be within a range of from about 100 to about 105 percent of stoichiometric equivalence for the molar ratio of diol to mercapto-functional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the mercapto-functional silicon compound of formula (I) of this invention. Optimal temperatures and pressures (vacuum) for running the thin film process will depend upon the specific starting mercapto-functional silane's alkoxy groups and diol used in the process. Additionally, if an optional inert solvent is used in the process, that choice will affect the optimal temperatures and pressures (vacuum) utilized.

The by-product alcohol vaporized from the film is removed from the reactive distillation apparatus by a standard partial vacuum-forming device and can be condensed, collected and recycled as feed to other processes. The mercapto-functional silicon compound of the general formula (I) product is recovered by standard means from the reactive distillation apparatus as a liquid phase. If an inert solvent has been used or if additional purification is necessary or desirable, the mercapto-functional silicon compound of formula (I) product may be fed to another similar distillation apparatus or distillation column to effect that separation. Optionally, the product may be neutralized to improve product storage.

The invention may be better understood by reference to the following examples in which the parts and percentages are by weight unless otherwise indicated.

EXAMPLES

Example 1. Synthesis of the Mercapt-Functional Silicon Compound

Into a 5-liter, round-bottomed flask was added 1190 grams of 3-mercaptopropyltriethoxysilane (received from Momemtive Performance Materials tradename Silquest® A-1891 silane) and 1.27 grams of sulfuric acid (500 ppm). The flask was placed under a vacuum of 8 kilopascals and heated to 50° C. To the stirring mixture was added dropwise 1350 grams of 2-methyl-1,3-propanediol, using an addition funnel over a period of 3 hours. The mixture was stripped until no additional material was collected in the receiver. To the stirring mixture was added 4.1 grams 21% sodium ethoxide in ethanol to neutralize the mixture. Additional sodium ethoxide was added if necessary to bring the pH between 6.0 and 6.5. The flask was placed under full vacuum to remove any remaining ethanol, and then the mixture was allowed to cool to room temperature. Celite, 50 grams, was added and the mixture was stirred for 20-30 minutes and then filtered through a thirty-micron filter pad.

The reaction product was analyzed by gas chromatography/mass spectrometry on an Agilent Technologies 5973 bench top GC/MS. The sample was diluted in methylene chloride to 10 weight percent and 1 µL was injected onto a 30 m×0.25 mm HP5 column. The GC was programmed to hold at 50° C. for 2 minutes, increased at 8° C. per minute, and held for 2 minutes at 340° C. The injection port was set to 250° C. The GC/MS analysis showed that the reaction product was a mixtures of several mercapto-functional silicon compounds.

The reaction product was analyzed by nuclear magnetic resonance (NMR) spectroscopy on a Bruker AC-P 300 Spectrometer operating at field strength of 7.05 T; $^1$H's resonate at 300 MHz. The sample is placed in a 10 mm NMR tube and diluted with 0.1M Cr(AcAc)$_3$/CDCl$_3$. Inverse gated decoupling pulse sequence is used with a pulse width of 45-degrees and 30% duty cycle ($^{13}$C: delay of 3.8 s, AQ of 1.6 s). The $^{13}$C NMR analysis of the sample indicates the major signals are associated with cyclic and bridged the mercapto-functional silicon compound. The silicon atoms were can bridge two Si atoms or forms a cyclic by being attached to the same Si atom. The $^{29}$Si NMR spectrum consists of a set of strong signals observed ranging from δ-44 to δ -46 consistent with a $T^0$ species. $^{13}C$ NMR of the reaction mixture and the chemical assignments indicating that the diol form a 6-member ring with a single silicon atom and also formed a bridge between two silicon atoms.

Example 2: Preparation and Cleaning of Cold Roll Steel Metal Substrate Panels

The substrate used for testing was Cold Roll Steel APR10184 substrate available from ACT Test Panels.

The solution to clean the Cold Roll Steel consisted of 0.06 percent by weight Triton X-100, 0.52% wt sodium metasilicate (anhydrous), 0.49 percent by weight sodium carbonate (anhydrous), 0.35 percent by weight sodium phosphate, dibasic (anhydrous), all available from Aldrich, and 98.57 percent by weight de-ionized water. The process to clean the Cold Roll Steel panels consisted of the following procedure. The materials above were mixed together and heated to a temperature of between 65° C. to 70° C. The Cold Roll Steel panels were then immersed in the stirring solution for 2 to 3 minutes to remove any oil contaminants. The panels were then removed from the solution and immediately rinsed with de-ionized water. Kimwipe Kimtech Delicate Task Wipers, available from Kimberly Clark, were then used to wipe the panels dry. The panels were then lightly sprayed with water to determine the water break of the cleaned panels. If the panels showed water beading, the cleaning process was repeated, if the water formed a continuous sheen, then the panels were dried with a Kimwipe wiper and stored for use.

Example 3: Preparation of Grind Paste

To a 400 mL plastic tricorner beaker, which was fastened securely to a mixer with a Cowles grinding blade, were added 250 grams of zirconimum oxide (ZrO) beads for grinding the pigment, resin, & solvents, 78.45 grams of n-butyl acetate solvent (obtained from Aldrich), 31.68 grams of Epon 1001F and 60.72 grams of Epon 828 resin (both obtained from Hexion/MSC). The mixer was set to high speed for Cowles Mill grinding until all the Epon 1001F solid flake was well dissolved in solution.

Under slow mixing agitation, 66.00 grams of titanium oxide (obtained from DuPont under the name R960 $TiO_2$) was slowly added to the mixture, followed by 16.50 grams of barium sulfate (obtained from J.M. Huber Corporation), 3.30 grams of carbon black 318NM, (obtained from Lanxess), 16.50 grams Microtalc MP-15-38 (obtained from Barretts Minerals Inc), and 0.66 grams of Bentone 34 (obtained from Elementis)

Once all of the materials were incorporated into the beaker, the mixer was set to high speed for approximately 35 minutes. A Hegman grind was checked after 35 minutes to determine the quality of the grind. A Hegman grind rating of about 5 was achieved. At this point, the grind paste was filtered and poured into ajar to collect the grind paste for preparation of multiple primer coatings.

Comparative Example I: Preparation of Control Primer Formulation

The epoxy resin mixture and the amine curative were prepared separately.

The epoxy resin mixture (Comparative Example IA) was prepared by adding 47.18 grams of Example 3 Grind Paste and 11.37 grams of epoxy resin, Epon 828, to a 100 mL jar. The materials were well mixed, and then stored until needed.

The amine curative (Comparative Example IB) was prepared by adding 2.91 grams of EpiKure 3115E-73, 1.09 grams of EpiKure 3200, and 7.44 grams of EpiKure 3251 to a 25 mL jar. The materials were well mixed and then stored until needed. The EpiKure 3115E-73, EpiKure 3200, and EpiKure 3251 were obtained from Hexion/MSC.

The catalyzed primer was prepared by adding 12.55 grams of epoxy resin mixture and 2.45 grams of amine curative to a 25 mL plastic beaker. The composition was well mixed prior to spray application.

Example 4: Preparation of Primer Formulation #1

The epoxy resin mixtures and the amine curative were prepared separately.

The epoxy resin mixture (Example 4A), a reactive resin (b) having at least one epoxy group, was prepared by adding 47.04 grams of Example 3 Grind Paste and 11.34 grams of epoxy resin, Epon 828 to a 100 mL jar. The materials were well mixed, and then stored until needed.

The amine curative Example 4B was prepared by adding 2.89 grams of EpiKure 3115E-73, 1.08 grams of EpiKure 3200, 0.27 grams of the mercapto-functional silicon compound prepared in Example 1and 7.39 grams of EpiKure 3251 to a 25 mL jar. The materials were well mixed and then stored until needed.

The catalyzed primer was prepared by adding 12.51 grams of epoxy resin mixture and 2.49 grams of amine curative containing the mercapto-functional silicon compound from Example 1 to a 25 mL plastic beaker. The composition was well mixed prior to spray application.

Example 5: Preparation of Primer Formulation #2

The epoxy resin mixture and the amine curative were prepared separately.

The epoxy resin mixture Example 5A was prepared by adding 46.87 grams of Example 3 Grind Paste and 11.30 grams of epoxy resin, Epon 828 to a 100 mL jar. The materials were well mixed, and then stored until needed.

The amine curative Example 5B prepared by adding 2.81 grams of EpiKure 3115E-73, 1.05 grams of EpiKure 3200, 0.81 grams of mercapto-functional silicon compound prepared in Example 1 and 7.17 grams of EpiKure 3251 to a 25 mL jar. The materials were well mixed and then stored until needed.

The catalyzed primer was prepared by adding 12.46 grams of epoxy resin mixture and 2.54 grams of amine curative to a 25 mL plastic beaker. The composition was well mixed prior to spray application.

Comparative Example II: Preparation of Comparable Primer Formulation #1

The epoxy resin mixture and the amine curative were prepared separately.

The epoxy resin mixture (Comparative Example IIA) was prepared by adding 47.20 grams of Example 3 Grind Paste, 11.10 grams of epoxy resin, Epon 828, and 0.27 grams Silquest A-187 (obtained from Momentive Performance Materials) to a 100 mL jar. The materials were well mixed, and then stored until needed.

The amine curative (Comparative Example IIB) was prepared by adding 2.91 grams of EpiKure 3115E-73, 1.05 grams of EpiKure 3200, and 7.43 grams of EpiKure 3251 to a 25 mL jar. The materials were well mixed and then stored until needed.

The catalyzed primer was prepared by adding 12.55 grams of epoxy resin mixture and 2.45 grams of amine curative. The composition was well mixed prior to spray application.

Comparative Example III: Preparation of Comparable Primer Formulation #2

The epoxy resin mixture and amine curative were prepared separately.

The epoxy resin mixture (Comparative Example IIIA) was prepared by adding 46.14 grams of Example 3 Grind Paste and 11.36 grams of epoxy resin, Epon 828 to a 100 mL jar. The materials were well mixed, and then stored until needed.

The amine curative (Comparative Example IIIB) was prepared by adding 2.86 grams of EpiKure 3115E-73, 1.06 grams of EpiKure 3200, 0.27 grams Silquest A-1110 (obtained from Momentive Performance Materials), and 7.30 grams of EpiKure 3251 to a 25 mL jar. The materials were well mixed and then stored until needed The catalyzed primer was prepared by adding 12.54 grams of epoxy resin mixture and 2.46 grams of amine curative to a 25 mL plastic beaker. The composition was well mixed prior to spray application.

Table #1 summarizes the use of the reactive composition comprising mercapto-functional silicon compound (a) and reactive resin (b) in an epoxy-amine primer formulation at 1 weight percent and 3 weight percent additions based on 100 parts epoxy resin solids. The comprising mercapto-functional silicon compound (a) was then placed in the amine curative. These primer formulations containing the comprising mercapto-functional silicon compound (a) and reactive resin (b) were compared to primers containing no organofunctional silane, and primers containing 1 weight percent epoxysilane on 100 parts of epoxy resin solids placed into the epoxy blend portion, and a system containing 1 weight percent of an aminosilane based on 100 parts resin solids of epoxy. The aminosilane, however, was then added to the amine curative portion in this example.

TABLE I

Summary of primer formulations

| Material Example | Comp. Ex. I grams | Ex. 4 grams | Ex. 5 grams | Comp. Ex. II grams | Comp. Ex. III grams |
|---|---|---|---|---|---|
| EPOXY RESIN | IA | 4A | 5A | IIA | IIIA |
| Example #3 Grind Paste | 47.19 | 47.03 | 46.86 | 47.21 | 47.15 |
| Epon 828 | 11.37 | 11.34 | 11.3 | 11.1 | 11.36 |
| Silquest ® A-187 | 0 | 0 | 0 | 0.27 | 0 |
| Total weight of Epoxy Resin mixture | 58.56 | 58.37 | 58.16 | 58.58 | 58.51 |
| AMINE CURATVE | IB | 4B | 5B | IIB | IIIB |
| EpiKure 3115E-73 | 2.91 | 2.89 | 2.81 | 2.91 | 2.86 |
| EpiKure 3200 | 1.09 | 1.08 | 1.05 | 1.08 | 1.06 |
| Mercapto-functional silicon compound from Example 1 | 0 | 0.27 | 0.81 | 0 | 0 |
| Silquest A-1110 | 0 | 0 | 0 | 0 | 0.27 |
| EpiKure 3251 | 7.44 | 7.39 | 7.17 | 7.43 | 7.3 |
| Total weight of amine curative | 11.44 | 11.63 | 11.84 | 11.42 | 11.49 |
| TOTAL WEIGHT | 70 | 70 | 70 | 70 | 70 |

Spray Application of primer coating from Examples 4 and 5 and Comparative Examples I, II, and III.

The primer coatings were spray applied over the bare Cold Roll Steel panels cut into 2 inch×2 inch squares. Primer spray application was conducted with a StartingLine HVLP gravity fed siphon spray hand spraygun, available through DeVilbiss. The coatings were sprayed at a wall pressure of 25 lb/in$^2$. The spray application technique was a side-to-side sweep of the spray onto the panel at a rate of approximately 1,000 in./min., indexing up and down the panel approximately 2 inches per sweep until approximately 3.0 mils of dry primer coating thickness was applied on the panel.

Primer Cure Time

Primers were cured no less than 24 hours prior to being coated with the white monocoat topcoat under ambient cure conditions.

Primer Conditioning Temperatures

After the primer were cured under ambient conditions for no less than 24 hours, these primers were conditioned in either ambient conditions or in −25° C. temperature conditions at time intervals of no less than 3 days, but no more than 10 days.

Therefore, 4 sets of temperature and time conditions were achieved.
1) Ambient Cure, Topcoated after 3 days
2) Freezer Conditioning at −25° C., Topcoated after 3 days
3) Ambient Cure, Topcoated after 10 days
Freezer Conditioning at −25° C., Topcoated after 10 days.

Preparation of White Topcoat Formulation

Below are examples used to formulate the white topcoat which was applied over the primer Examples 4 and 5 and Comparative Example I, II and III.

Example 8A describes the preparation of the White Topcoat's Rheological Control Intermediate.

Example 8B is a 5 weight percent dibutyl tin dilaurate solution in n-butyl acetate.

Example 8C describes the preparation of the White Grind Paste.

Example 8D is a 70 weight percent solution of Desmodur N3300 (obtained from Bayer Materials Science) and n-butyl acetate.

Example 8E describes the White Topcoat Formulation.

Example 8A describes the rheological control intermediate prepared for the white topcoat. Into a 500 mL plastic beaker, which was fastened securely to a mixer with a Cowles grinding blade, were added 250 grams of zirconium oxide (ZrO) beads for grinding the pigment, resin, & solvents, 137.14 grams of n-butyl acetate and 142.86 grams of Acrylamac 232-1375 (obtained from PCCR USA). This mixture was slowly agitated to dilute the Acrylamac 232-1375. The next addition involved slow incorporation of 20.00 grams Aerosil R812 (obtained from Evonik) under very slow mixer agitation. Once all of the Aerosil R812 had been placed into solution, the mixer speed was increased to high and cowles grind for at least 40 minutes. The Hegman fineness of grind was periodically checked. Once a Hegman grind of 5 or greater fineness had been achieved, an additional 50 grams of n-butyl acetate was added to thin the rheological additive blend and stirred under low-medium agitation for 5 minutes. An additional 50 grams of n-butyl acetate was further added to reduce the rheological additive blend and it was stirred slowly for 5 minutes. Finally, a final 75 grams of n-butyl acetate was added to the mixture and blended under slow agitation for approximately 5 additional minutes.

The rheological control intermediate (additive paste) was filtered and poured into a jar to collect the rheological control intermediate (additive paste) for preparation of the white monocoat.

Example 8B is a 5 weight percent dibutyl tin dilaurate solution in n-butyl acetate.

Example 8C described the preparation of the white grind paste. Into a 500 mL plastic beaker, which was fastened securely to a mixer with a Cowles grinding blade, were charged 100 grams of zirconium oxide (ZrO) beads for grinding the pigment, resin, & solvents, 55.37 grams of Acrylamac 232-1375, 5.70 grams of rheological control intermediate (additive paste) of Example 8A and 31.54 grams of n-butyl acetate. The stir speed was slow-medium. Slowly, 199.80 grams of DuPont $TiO_2$ R960 was added with stirring. Once all of the white pigment had been added to container, the mixing speed was set to high in order to initiate the grinding of the materials. After 20 minutes, and afterwards, the Hegman fineness of grind was periodically checked. Once a Hegman grind of 5 or greater fineness had been achieved, an additional 7.59 grams of n-butyl acetate was added and then the mixing speed was set to low-medium and mixed.

The white grind paste was filtered and poured into a jar to collect the white grind paste for preparation of the white monocoat.

Example 8D is a 70 weight percent solution of Desmodur N3300 (obtained from Bayer Materials Science) and n-butyl acetate.

Example 8E describes the preparation of the polyol portion of the white monocoat formulation.

Into a 250 mL container were charged under slow stirrer agitation 2.68 grams rheology control intermediate of Example 8A, 28.05 grams of the white paste intermediate prepared in Example 8C, followed 20.73 grams Acrylamac 232-1375. The stirrer speed was increased to medium and 0.66 grams Tinuvin 328 was added slowly followed by 0.19 grams Tinuvin® 292 (obtained from BASF), 0.02 grams of CoatOSil® 7001 (obtained from Momentive Perfromance Materials), 0.94 grams catalysts solution of Example 8B, and finally 1.65 grams of n-butyl acetate. The mixture was mixed under medium agitation for an additional 5 minutes, and then the container was closed and the material was stored for future use.

Example 8F described the mix quantities used to make the 2-component white monocoat. Into a 25 mL container, under low agitation, were charged 11.77 grams white polyol base prepared in Example 8E and 3.23 grams of Example 8D. It was stirred for 1 minute under medium agitation. The 2-component white monocoat was ready for spray application Table 2 describes the formulation in tabular format of the white monocoat formulation.

TABLE 2

| EXAMPLE 8F - WHITE MONOCOAT | |
| --- | --- |
| Material | grams T.S. |
| Part A. EXAMPLE 8E - WHITE POLYOL BASE | |
| Example 8A - Rheology Additive | 2.68 |
| Example 8C - White Tint Paste | 28.05 |
| Acrylamac 232-1375 | 20.73 |
| Tinuvin 328 | 0.66 |
| Tinuvin 292 | 0.19 |
| CoatOSil* 7001 | 0.02 |
| Example 8B - Catalyst Solution | 0.94 |
| N-Butyl Acetate | 1.65 |
| | 54.92 |
| Part B. EXAMPE 8D - ISOCYANATE BLEND | |
| | 15.08 |
| Total weight white monocoat | 70.00 |

Spray Application of primer coating from Examples 4 and 5 and Comparative Examples I, II, and III.

The primer coatings were spray applied over the bare Cold Roll Steel panels cut into 2 inch×2 inch squares. Primer spray application was conducted with a StartingLine HVLP gravity fed siphon spray hand spraygun, available through DeVilbiss. The coatings were sprayed at a wall pressure of 25 $lb/in^2$. The spray application technique was a side-to-side sweep of the spray onto the panel at a rate of approximately 1,000 in./min., indexing up and down the panel approximately 2 inches per sweep until approximately 3.0 mils of dry primer coating thickness was applied on the panel.

Primer Cure Time

Primers were cured no less than 24 hours prior to being coated with the white monocoat topcoat under ambient cure conditions.

Primer Conditioning Temperatures

After the primer were cured under ambient conditions for no less than 24 hours, these primers were conditioned in either ambient conditions or in −25° C. temperature conditions at time intervals of no less than 3 days, but no more than 10 days.

Therefore, 4 sets of temperature and time conditions were achieved.

4) Ambient Cure, Topcoated after 3 days
5) Freezer Conditioning at −25° C., Topcoated after 3 days
6) Ambient Cure, Topcoated after 10 days
7) Freezer Conditioning at −25° C., Topcoated after 10 days Spray Application of Example 8F White Topcoat The Example 8F white monocoat was then spray applied over the multiple primed panels which were cut into 2 inch×2 inch squares, based on the times listed in Example 11 for overcoating with white topcoat. White topcoat spray application was conducted with a StartingLine HVLP gravity fed siphon spray hand spraygun, available through DeVilbiss. The coatings were sprayed at a wall pressure of 25 $lb/in^2$. The spray application technique was a side-to-side sweep of the spray onto the panel at a rate of approximately 1,000 in./min., indexing up and down the panel approximately 2 inches per sweep until approximately 3.7 mils of dry White Topcoat coating thickness was applied on the panel.

White Topcoat+Primer Cure Time & Conditioning

Once the panels were coated with the white topcoat, the coating systems were then cured under ambient conditions for at least 24 hours. Afterwards, the panels were then placed into the −25° C. freezer or conditioned at ambient conditions for at least one week prior to adhesion testing.

Adhesion Results of the Primed+White Topcoated Panels

ASTM 3359 method B adhesion results were reported after 2 tape pulls using 3M 898 tape, unless failure had occurred after scoring the panels with the crosshatch tool. The squares were 2 mm×2 mm for the adhesion test. Results of the adhesion test are shown below:

TABLE 3A

| 3 Day Ambient Temperature Primer Conditioning | | | | | |
|---|---|---|---|---|---|
| Pimer coating | Comp. Ex. I | EX. 4 | EX. 5 | Comp. Ex. II | Comp. Ex. III |
| Adhesion Failure After Initial Scoring | 100% FAILURE TO METAL | 100% PASS | 100% PASS | 100% PASS | 100% PASS |
| Adhesion After TWO Tape Pulls | FAILED PRIOR | 100% PASS | 100% PASS | 100% PASS | 100% PASS |

TABLE 3B

| 10 Day Ambient Temperature Primer Conditioning | | | | | |
|---|---|---|---|---|---|
| Pimer coating | Comp. Ex. I | EX. 4 | EX. 5 | Comp. Ex. II | Comp. Ex. III |
| Adhesion Failure After Initial Scoring | 100% FAILURE TO METAL | 100% PASS | 100% PASS | 100% PASS | 100% PASS |
| Adhesion After TWO Tape Pulls | FAILED PRIOR | 100% PASS | 100% PASS | 100% PASS | 100% PASS |

TABLE 3C

| 3 Day, −25° C. Temperature Primer Conditioning | | | | | |
|---|---|---|---|---|---|
| Pimer coating | Comp. Ex. I | EX. 4 | EX. 5 | Comp. Ex. II | Comp. Ex. III |
| Adhesion Failure After Initial Scoring | 100% FAILURE TO METAL | 100% PASS | 100% PASS | 100% PASS | 100% PASS |
| Adhesion After TWO Tape Pulls | FAILED PRIOR | 100% PASS | 100% PASS | 100% PASS | 100% PASS |

TABLE 3D

| 10 Day, −25° C. Temperature Primer Conditioning | | | | | |
|---|---|---|---|---|---|
| Pimer coating | Comp. Ex. I | EX. 4 | EX. 5 | Comp. Ex. II | Comp. Ex. III |
| Adhesion Failure After Initial Scoring | 100% FAILURE TO METAL | 100% PASS | 100% PASS | 100% PASS | 100% PASS |
| Adhesion After TWO Tape Pulls | FAILED PRIOR | 100% PASS | 100% PASS | 100% PASS | 100% PASS |

Example 6: Calculated Volatile Organic Compounds of Silane Compounds

Table 4 lists the approximate calculated VOC and HAP generated with each silane

TABLE 4

| Silane | NONE | Mercapto-functional silicon compound from Ex. 1 | Silquest® A-187 | Silquest® A-1110 |
|---|---|---|---|---|
| VOC | N/A | <10.5 g/L | ~415 g/L | ~580 g/L |
| HAP | N/A | NONE Trace EtOH | YES MeOH | YES MeOH |

Examples 7-15 and Comparative Examples IV and V. Coating Formulations and Cure Properties Material was mixed in a 50 mL plastic beaker. The materials were added in the order of addition shown in Table 5. Once all materials were added to the plastic beaker, the blend of materials was stirred using a small blade which fit into the beaker. The samples were mixed until the ingredients were fully blended together. Results are summarized in Table 5. Amounts shown are in grams.

TABLE 5

| Formulation Experiments and Dry Time Results | | | | | | | | | | | |
|---|---|---|---|---|---|---|---|---|---|---|---|
| Material | Comp Ex IV | Com. Ex V | Ex. 7 | Ex. 8 | Ex. 9 | Ex. 10 | Ex. 11 | Ex. 12 | Ex. 13 | Ex. 14 | Ex. 15 |
| PSX700 Part A[1] | 30.09 | 30.09 | 30.09 | 30.09 | 30.09 | 30.09 | 30.09 | 30.09 | 30.09 | 30.09 | 30.09 |
| PSX700 Curative[1] | 4.91 | — | — | — | — | — | — | — | — | — | — |
| Silquest A-1100[2] | — | 4.67 | — | — | 2.33 | — | — | — | — | — | — |
| MercaptoSilane | — | — | 10.3 | 10.31 | 5.15 | 7.22 | 8.25 | 9.28 | 10.31 | 11.34 | 10.31 |
| DBTDL[3] | — | 0.25 | 0.25 | 0.25 | 0.25 | 0.25 | 0.25 | 0.25 | 0.25 | 0.25 | — |
| Epikure 3253[4] | — | — | — | 0.25 | 0.25 | 0.25 | 0.25 | 0.25 | 0.25 | 0.25 | 0.25 |
| Dry Time[5] Results | | | | | | | | | | | |
| Set-To-Touch/ hrs | 4.33 | 4.00 | No cure | 5.00 | 3.00 | 4.00 | 3.50 | 3.50 | 3.75 | 3.50 | 1.25 |

TABLE 5-continued

Formulation Experiments and Dry Time Results

| Material | Comp Ex IV | Com. Ex V | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|
| Tack-Free/hrs | 6.50 | 5.50 | No cure | 6.25 | 5.00 | 5.00 | 4.00 | 4.50 | 4.50 | 5.50 | 1.75 |
| Dry-Hard/hrs | 7.50 | 8.00 | No cure | 7.50 | 6.33 | 8.00 | 5.00 | 7.00 | 7.00 | 9.50 | 2.00 |

[1]PSX700 is an epoxy/polysiloxane coating and PSX700CURE is an epoxy coating curative are available through PPG Industries[Please verify these descriptions]
[2]Silquest A-1100 is gamma-aminopropyltriethoxysilane obtained from Momentive Performance Materials
[3]DBTDL = dibutyl tin dilaurate obtained from Aldrich
[4]Epikure 3253, tertiary amine catalyst, obtained from Momentive Specialty Chemicals
[5]Dry Time Results were obtained using a B.K. Drying Recorder available from Mickle Laboratory Engineering Group, Gonshall Guildford, Surry, GU5 9LJ, United Kingdom As shown in Table 5, the invention can be used as an odor-free curative to cure epoxy/polysiloxane coating systems with the presence of a tertiary amine catalyst and a faster dry time was obtained through the elimination of the tin catalyst as shown in Experiment 15 versus the control formulations in Comparative Examples IV and V.

Example 16. Preparation of 3-(2-methyl-2,4-pentanedioxyethoxysilyl)-1-propanethiol from 2-methyl-2,4-pentanediol and 3-(triethoxysilyl)-1-propanethiol A 250-ml round bottom flask equipped with a magnetic stir bar, water condenser (connected to a vacuum pump), dropping funnel, internal thermometer, and heating mantle, was charged with 122.2 grams 3-(triethoxysilyl)-1-propanethiol (98.5%, 0.505 mol), 111 mg of paratoluenesulfonic acid, and 61.02 grams 2-methyl-2,4-pentanediol (99%, 0.511 mol). The reaction flask content was heated to 33 C and vacuum (11 mm Hg) was applied, in order to remove ethanol formed. The temperature was raised to 60 C after 2 hours, to complete the reaction and remove any remaining ethanol. The temperature was raised to 60 C after 2 hours, to complete the reaction and remove any remaining ethanol. 135.6 grams of 3-(2-methyl-2,4-pentanedioxyethoxysilyl)-1-propanethiol product (84% purity, 0.431 mol, 99.2% yield) were obtained.

While the invention has been described with reference to a number of embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
   (a) at least one mercapto-functional silicon compound having the general formula (I):

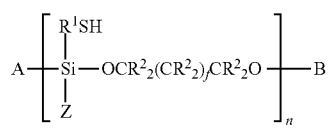

(I)

wherein
A is $-OCR^2_2(CR^2_2)_fCR^2_2OH$, or

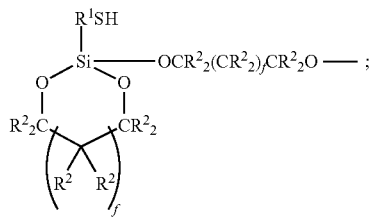

and
B is H, or

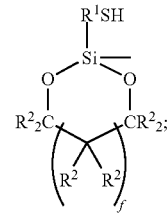

each occurrence of Z is independently selected from the group consisting of $-OCR^2_2(CR^2_2)_fCR^2_2OH$,

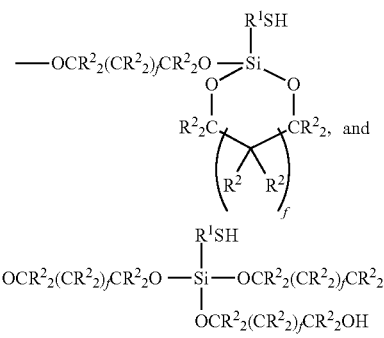

each occurrence of $R^1$ is $-CH_2-$, $-CH_2CH_2-$ or $-CH_2CH_2CH_2-$;
each occurrence of $R^2$ is hydrogen, $-CH_3$ or $-CH_2CH_3$;
each occurrence of the subscript f is independently an integer, where f is 0 or 1; and the subscript n is an integer from 3 to 15, and/or a partial hydrolyzate or condensate thereof having the general formula (II):

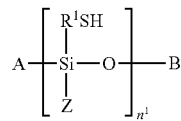

wherein A, B, $R^1$ and Z are defined above and the subscript $n^1$ is an integer from 3 to 15; and (b) a reactive resin having at least one (meth)acrylate group.

2. The composition of claim 1 wherein $R^1$ is —$CH_2CH_2CH_2$—; $R^2$ is chosen from hydrogen or —$CH_3$; and f is 1.

3. The composition of claim 1 wherein the reactive resin component (b) is an organic compound or mixtures of organic compounds having at least one (meth)acrylate group per molecule with a number average molecular weight in the range of from about 100 to about 12,000.

4. The composition of claim 1 wherein the reactive resin (b) has the general formula (V):

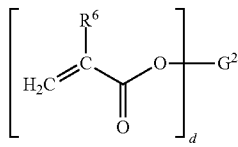

wherein:
wherein each occurrence of $R^6$ is independently hydrogen or methyl;
wherein $G^2$ is a divalent or a polyvalent organic group containing from 1 to 2,000 carbon atoms, with the proviso that the oxygen of the $H_2C=C(R^6)C(=O)O$— group is bonded to the carbon atom of the $G^2$ group; and
wherein d is an integer of from 2 to 8.

5. The composition of claim 1 further comprising (c) a curing agent, which is ultraviolet radiation, gamma-radiation and combinations thereof.

6. The composition of claim 5 wherein the curing agent (c) is radiation in combination with a radiation active initiator.

7. The composition of claim 1 further comprising and a filler.

8. A coating comprising the composition of claim 1.

9. A sealant comprising the composition of claim 1.

10. A composition comprising:
(a) at least one mercapto-functional silicon compound having the general formula (I):

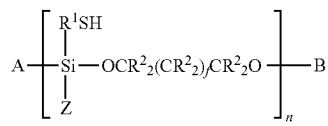

wherein
A is —$OCR^2_2(CR^2_2)_fCR^2_2OH$, or

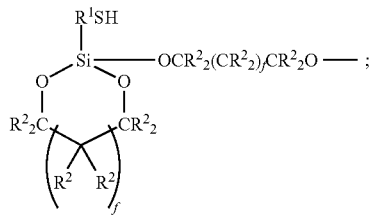

and
B is H, or

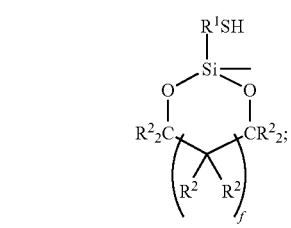

each occurrence of Z is independently selected from the group consisting of
—$OCR^2_2(CR^2_2)_fCR^2_2OH$,

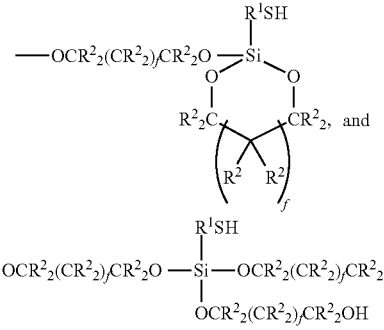

each occurrence of $R^1$ is —$CH_2$—, —$CH_2CH_2$— or —$CH_2CH_2CH_2$—;
each occurrence of $R^2$ is hydrogen, —$CH_3$ or —$CH_2CH_3$;
each occurrence of the subscript f is independently an integer, where f is 0 or 1; and
the subscript n is an integer from 3 to 15, and/or a partial hydrolyzate or condensate thereof having the general formula (II):

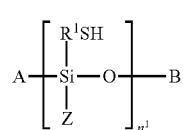

wherein A, B, $R^1$ and Z are defined above and the subscript $n^1$ is an integer from 3 to 15;

(b) a reactive resin having the general formula (IV):

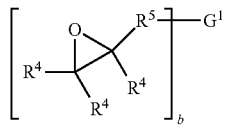

wherein:
each occurrence of $R^4$ is independently hydrogen, or an alkyl group of from 1 to 8 carbon atoms, a phenyl group or an aralkyl or arenyl group of from 7 to 12 carbon atoms;
each occurrence of $R^5$ is a divalent organic group of from 1 to 12 carbon atoms or a chemical bond;
$G^1$ is a divalent or polyvalent organic group containing from 1 to 2,000 carbon atoms; and b is an integer of from 2 to 8; and
(c) a curing agent which is a hardner selected from the group consisting of selected from the group consisting of aliphatic primary amines, aliphatic secondary amines, aliphatic primary polyamines, aliphatic secondary polyamines, and combinations thereof.

11. The composition of claim 10 wherein the reactive resin component (b) has an epoxide equivalent weight of from about 100 to about 2,000 grams per equivalent.

12. The composition of claim 10 wherein $R^1$ is —$CH_2CH_2CH_2$—; $R^2$ is hydrogen or —$CH_3$; and f is 1.

13. The composition of claim 10 further comprising and a filler.

14. A coating comprising the composition of claim 10.

15. A sealant comprising the composition of claim 10.

16. A composition comprising
(a) a mercapto-functional silicon compound of the formula (III):

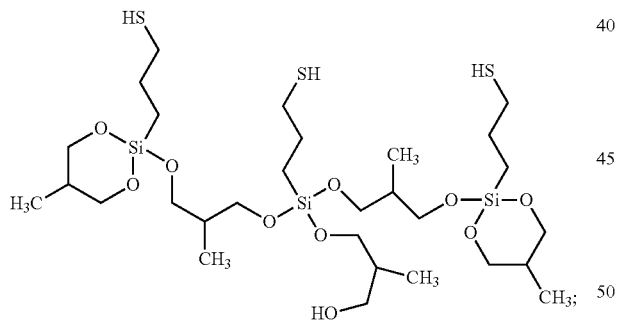

and
(b) a reactive resin having at least one (meth)acrylate group.

17. A composition comprising
(a) a mercapto-functional silicon compound (a) is of the formula (III):

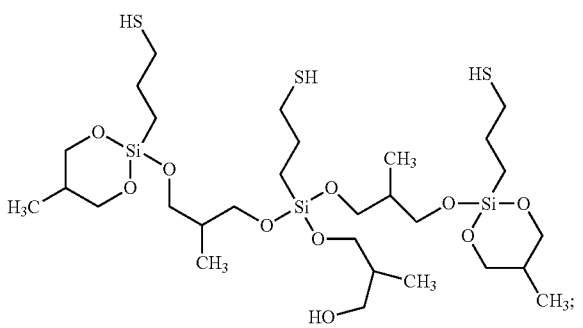

(b) a reactive resin having the general formula (IV):

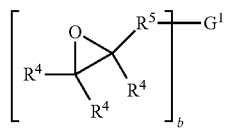

wherein:
each occurrence of $R^4$ is independently hydrogen, or an alkyl group of from 1 to 8 carbon atoms, a phenyl group or an aralkyl or arenyl group of from 7 to 12 carbon atoms each occurrence of $R^5$ is a divalent organic group of from 1 to 12 carbon atoms or a chemical bond;
$G^1$ is a divalent or polyvalent organic group containing from 1 to 2.000 carbon atoms; and b is an integer of from 2 to 8; and
(c) a curing agent which is a hardner selected from the group consisting of selected from the group consisting of aliphatic primary amines. aliphatic secondary amines. aliphatic primary polyamines. aliphatic secondary polyamines. and combinations thereof.

* * * * *